United States Patent
Shirer et al.

(10) Patent No.: US 12,551,659 B2
(45) Date of Patent: Feb. 17, 2026

(54) CATHETER CONTROL SYSTEMS AND METHODS

(71) Applicant: Tobin Health, LLC, Nashville, TN (US)

(72) Inventors: William Ray Shirer, Palo Alto, CA (US); Bryan Loomas, Los Altos, CA (US)

(73) Assignee: Tobin Health, LLC, Nashville, TN (US)

( * ) Notice: Subject to any disclaimer, the term of this patent is extended or adjusted under 35 U.S.C. 154(b) by 0 days.

(21) Appl. No.: 18/301,904

(22) Filed: Apr. 17, 2023

(65) Prior Publication Data

US 2024/0342438 A1    Oct. 17, 2024

(51) Int. Cl.
*A61M 25/01* (2006.01)

(52) U.S. Cl.
CPC .............................. *A61M 25/0113* (2013.01)

(58) Field of Classification Search
CPC .......... A61M 25/0113; A61M 25/0026; A61M 2025/0175; A61M 2025/0037; A61M 2025/0039; A61M 2025/004; A61M 25/0029
See application file for complete search history.

(56) References Cited

U.S. PATENT DOCUMENTS

| | | | |
|---|---|---|---|
| 5,282,479 A | 2/1994 | Havran | |
| 5,533,980 A | 7/1996 | Sweeney et al. | |
| 5,624,397 A | 4/1997 | Snoke et al. | |
| 6,146,373 A * | 11/2000 | Cragg | A61B 17/12186 604/48 |
| 7,762,993 B2 | 7/2010 | Perez | |
| 8,235,944 B2 | 8/2012 | Gharib | |
| 10,220,180 B2 | 3/2019 | Hochman | |
| 10,441,756 B2 | 10/2019 | Castro et al. | |
| 2006/0041245 A1 * | 2/2006 | Ferry | A61B 17/3403 604/95.01 |
| 2008/0065029 A1 | 3/2008 | Racz | |
| 2009/0088697 A1 | 4/2009 | Datta et al. | |
| 2009/0234280 A1 | 9/2009 | Tah et al. | |
| 2010/0041990 A1 | 2/2010 | Schlitt et al. | |
| 2013/0261533 A1 | 10/2013 | Norkunas | |

(Continued)

FOREIGN PATENT DOCUMENTS

AU    199922258 B2    8/1999

OTHER PUBLICATIONS

Braun Medical Inc., "Contiplex Tuohy Ultra, Echogenic needle and non-stimulating catheter system for continuous herve block," retrieved at https://www.bbraunusa.com/en/products/b/contiplex-tuohy-ultra.html on May 11, 2023, 4 pages.

(Continued)

*Primary Examiner* — James D Ponton
*Assistant Examiner* — Hong-Van N Trinh

(57) ABSTRACT

Example catheter control systems and methods are described. In one implementation, an apparatus includes a housing that includes a first lumen configured to receive a catheter, a second lumen configured to receive fluid, and a third lumen configured to allow the catheter and the fluid to pass through the third lumen simultaneously. A catheter controller is associated with the housing and controls movement of the catheter through the housing.

15 Claims, 31 Drawing Sheets

(56) References Cited

U.S. PATENT DOCUMENTS

| | | |
|---|---|---|
| 2015/0148894 A1 | 5/2015 | Damm et al. |
| 2015/0314104 A1 | 11/2015 | Almansouri et al. |
| 2017/0120001 A1 | 5/2017 | Hyer et al. |
| 2017/0120016 A1 | 5/2017 | Burkholz et al. |
| 2017/0274182 A1 | 9/2017 | O'Bryan et al. |
| 2018/0338797 A1* | 11/2018 | Moore .................. A61B 5/065 |
| 2020/0353224 A1* | 11/2020 | Kusu ................ A61M 25/0905 |

OTHER PUBLICATIONS

Medovate, "Safira, Instructions for Use", MP-0007-2010 ver.2.0, Feb. 2022, 26 pages.

\* cited by examiner

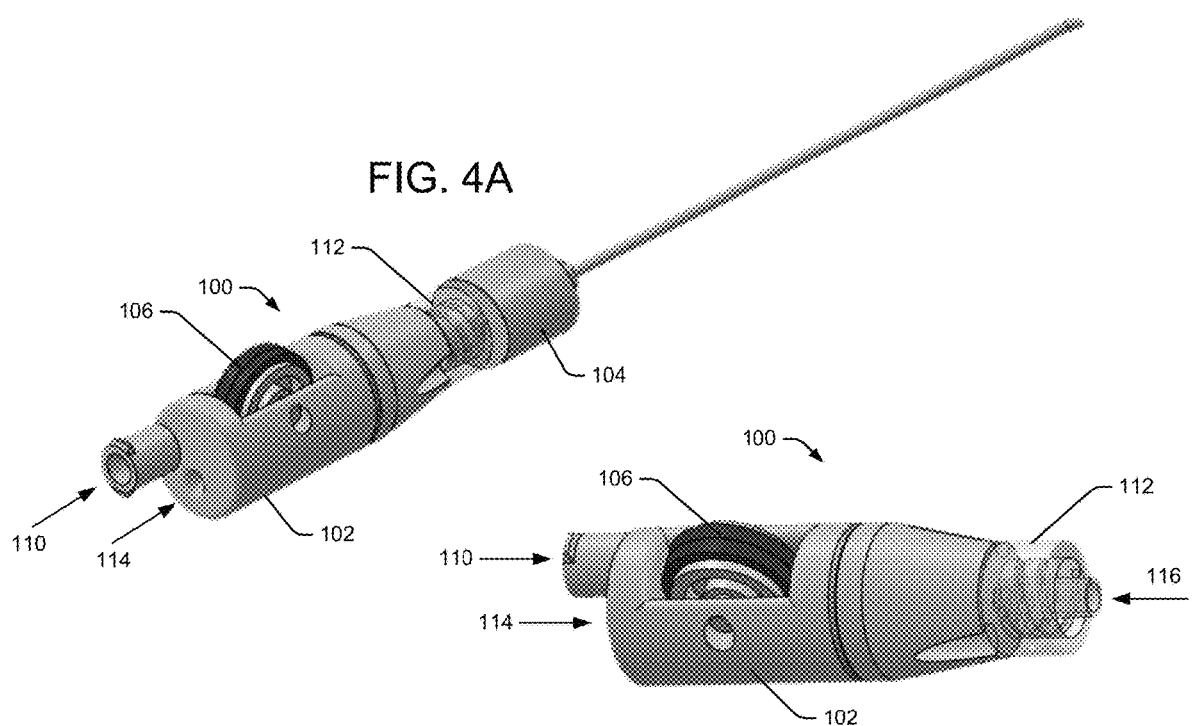

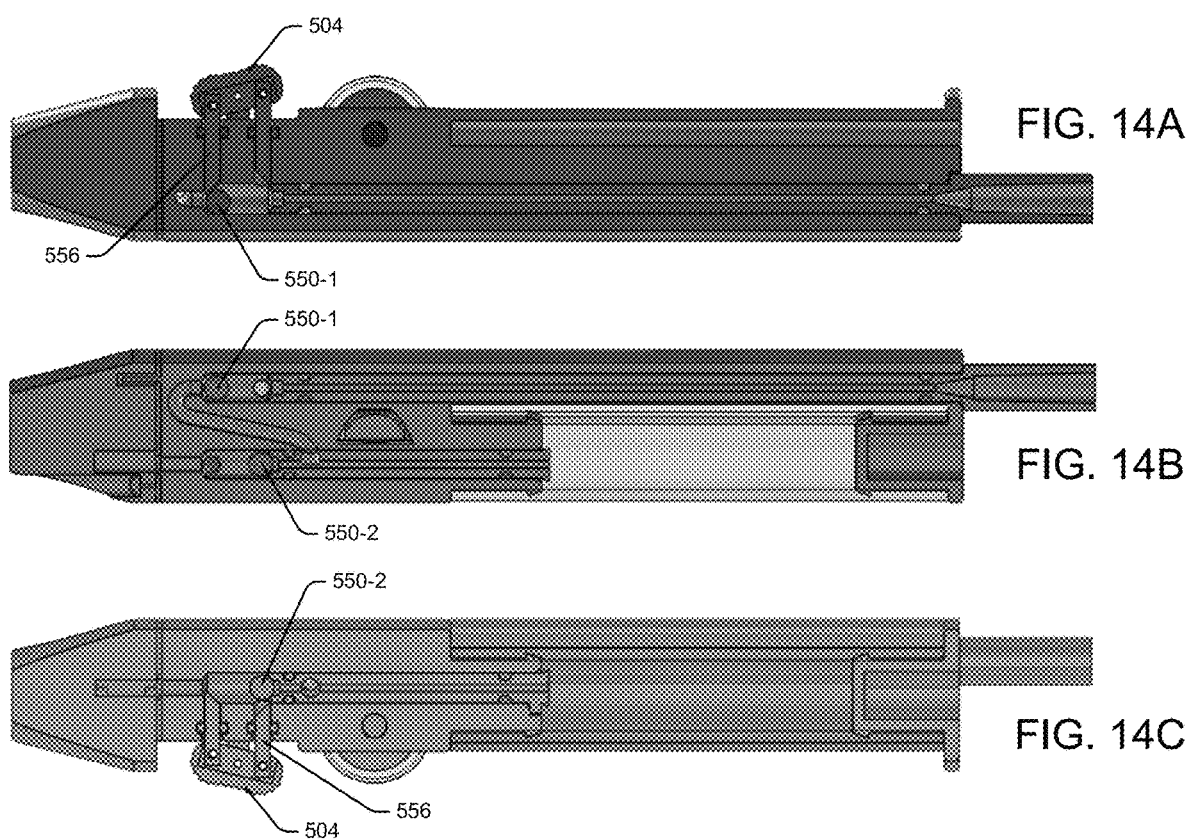

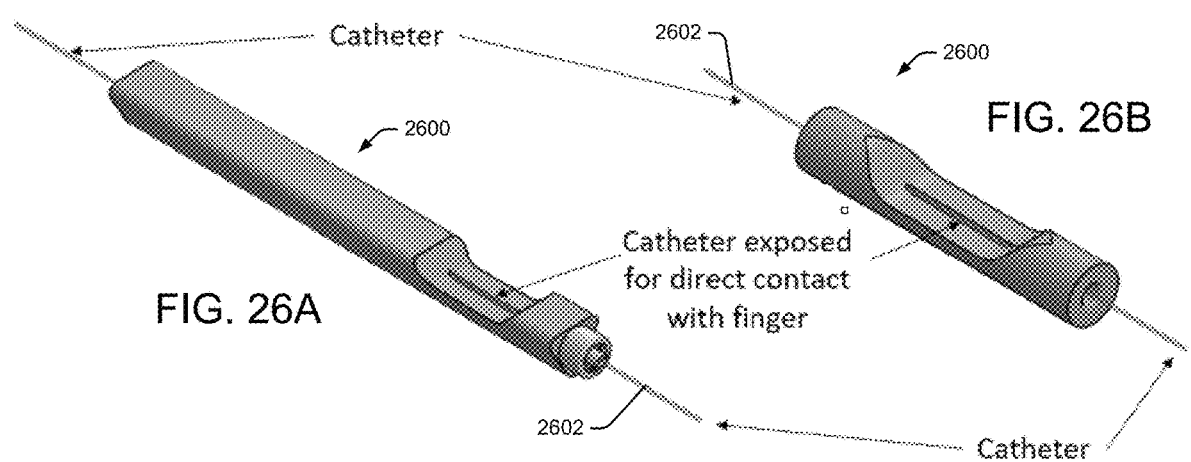

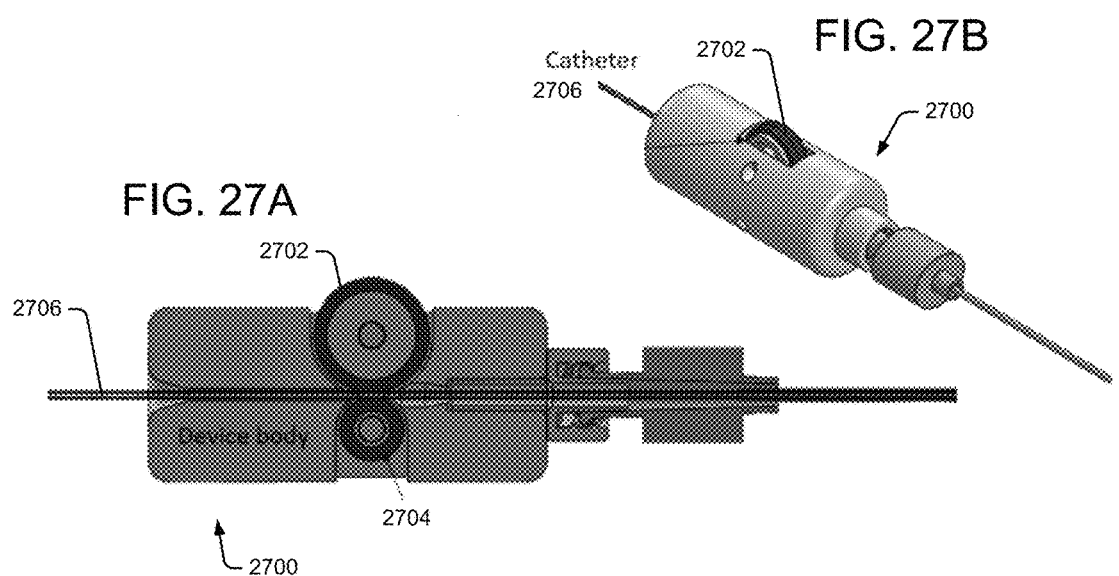

CATHETER CONTROL SYSTEMS AND METHODS

TECHNICAL FIELD

The present disclosure relates to catheter control systems and methods that allow a user to control the movement of a catheter.

BACKGROUND

Various medical procedures include the use of regional anesthesia to provide pain control for pain that may be experienced by a patient during or for hours or days after the medical procedure. For example, regional anesthesia may use nerve block techniques to numb an area damaged by trauma, surgery, and the like. A single injection may be performed for short-term pain control (e.g., 12-24 hours) or a catheter may be left in place for longer-term pain control (e.g., 5-7 days). For example, the nerve block techniques may include the insertion of a catheter that stays in place to deliver medicine to the area of the targeted nerves.

Existing catheter placement techniques for regional anesthesia typically require two people to perform the process. For example, a first person uses a first hand to hold an ultrasound probe to visualize a target area. The first person uses their second hand to control the needle (e.g., moving the needle to the target area within the patient). A second person controls the injection or aspiration of fluid, and/or insertion/withdrawal of the catheter, into or out of the patient via the needle while the first person maintains the position of the needle at the desired location.

In some situations, a single person may attempt to perform all aspects of the process discussed above. Such operation requires the single person to release control of the needle, which may cause the needle to move (or drift) to an undesirable location (e.g., move away from the target area). If the needle moves away from the target area, the precision of catheter placement may be diminished, requiring additional procedure time to reposition the catheter until it is properly placed to deliver medicine. Including a second person in the process increases the resources required and, in many situations, the second person (who is injecting and aspirating fluid as well as inserting the catheter) may be less experienced with the catheter placement process.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIGS. 4A and 4B depict perspective views of an embodiment of the handheld device of FIG. 1.

FIGS. 14A-14C depict a cut away view of an embodiment of the handheld device of FIG. 5.

FIGS. 26A-26C depict perspective views of other embodiments of a handheld device.

FIGS. 27A and 27B depicts perspective views of another embodiment of a handheld device.

DETAILED DESCRIPTION

Figure 1:
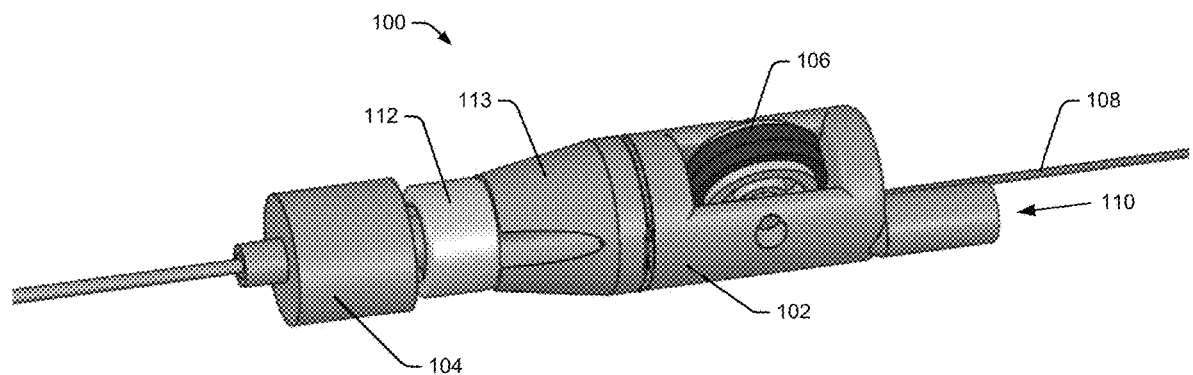
FIG. 1 depicts a perspective view of an embodiment of a handheld device.

The systems and methods described herein provide an improved technique for a regional anesthesia process that can be performed by a single person. In some embodiments, the described systems and methods allow a person to use their first hand to hold an ultrasound probe to visualize a target area and use their second hand to control placement of the needle and insertion/withdrawal of the catheter into or out of the patient via a needle. In other embodiments, the described systems and methods allow a person to use their first hand to hold an ultrasound probe to visualize a target area and use their second hand to control a needle, while also controlling the injection and aspiration of fluid as well as insertion/withdrawal of the catheter into the patient via the needle. Thus, the single person can perform all aspects of the process, which provides a safe and accurate placement of the catheter into the patient. This approach eliminates the need for a second person to assist with the catheter placement process. Instead, a primary anesthesiologist or other medical personnel can retain complete control of the entire catheter placement process.

In the following description, reference is made to the accompanying drawings that form a part thereof, and which are shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The systems and methods described herein allow a human operator to control (or manipulate) the movement of a catheter, such as moving a catheter into or out of a patient, such as a human patient, an animal patient, and the like. In some embodiments, the human operator holds or grasps a device that allows the catheter control discussed herein. For example, the device may include a housing with a first lumen to receive a catheter, a second lumen to receive a fluid, and a third lumen that allows the catheter and fluid to pass through the third lumen simultaneously. As used herein, the term "lumen" may also be referred to as a path, a fluid path, a catheter path, a port, an opening, an aperture, a cavity, a channel, and so forth. The device may also include a catheter controller that controls movement of the catheter into or out of the housing.

As discussed herein, a catheter refers to any type of hollow tubing that is designed for insertion into a human body, an animal body, and the like. In many implementations, the catheter is somewhat flexible. In some embodiments, a catheter may be used for draining fluids, administering fluids to a patient, providing access for medical instruments (e.g., surgical instruments), and the like.

In particular implementations, the systems described herein may allow control of a catheter as well as fluid into and out of a body, such as a human body or animal body. The fluid may include saline, medicine, anesthetic, bodily fluids, and the like.

In some embodiments, the described device may include a mechanism for attaching fluid tubing and/or a needle. For example, a Luer fitting can be used to attach a needle to a distal end of the device and attach a fluid tubing to the proximal end of the device.

As mentioned above, the described systems support movement of a catheter through a device and into or out of a human body. In some embodiments, this movement of the catheter can be accomplished by a frictional sliding force applied to the outer surface of the catheter to push or pull the catheter along its axis. The frictional sliding force can be applied to the outer surface of the catheter in a variety of ways, such as sliding with a human finger, a wheel, a mechanical slider, or other mechanical contact system.

As discussed herein, in some embodiments, the path (e.g., lumen) of a catheter through a device and the path (e.g., lumen) of fluid through the device are joined such that the catheter and the fluid enter the device at different locations, but are joined together such that they exit the device at the same location.

FIG. 1 depicts a perspective view of an embodiment of a handheld device 100. As discussed herein, catheter control device 100 includes a first lumen (e.g., a fluid path), a second lumen (e.g., a catheter path), a third lumen that combines the first lumen and the second lumen, and a catheter controller to control the motion of the catheter. In the embodiment of FIG. 1, device 100 includes a housing 102, a removable needle portion 104, a Luer fitting 112, a nose cone 113 (also referred to as a manifold), and a catheter controller 106. Housing 102 can be manufactured from a variety of materials, such as ABS (Acrylonitrile Butadiene Styrene) plastic, polycarbonate plastic, and the like. Housing 102 is designed such that it can be easily held by a single human hand and manipulated by a user of device 100 while holding the device.

Device 100 includes one path (or lumen) through the device that accommodates a catheter 108. Device 100 also includes another path (or lumen) 110 through the device that accommodates fluid. For example, the fluid may include saline, medicine, anesthetic, bodily fluids, and the like. In an example discussed herein, the lumen for catheter 108 and the lumen 110 for fluids are separate paths at a first end of device 100 (e.g., the right end of device 100 as illustrated in FIG. 1). The two lumens combine into a single lumen (single path) at the opposite end of device 100 (e.g., the left end of device 100 as illustrated in FIG. 1). In other examples, device 100 may have any number of lumens entering and exiting from any location on device 100. Nose cone 113 may be configured to merge any number of lumens, such as a first lumen, a second lumen, and a third lumen, as discussed herein.

Catheter controller 106 is shown as a wheel in the example of FIG. 1. In some embodiments, the wheel is configured to be rotated forward or backward by the finger of a user holding device 100. The outer surface of the wheel contacts the outer surface of catheter 108 causing catheter 108 to move forward or backward through device 100. In some implementations, the outer surface of the wheel is made of a material that provides friction with the outer surface of catheter 108 to move catheter 108 as the wheel is rotated by the user's finger. The outer surface of the wheel may be manufactured using elastomerics (TPE (Thermoplastic elastomer), silicone, or urethane), and the like. The wheel shown in FIG. 1 illustrates one example of catheter controller 106. Alternate embodiments of catheter controller 106 are illustrated and discussed herein.

In some embodiments, movement of catheter controller 106 causes catheter 108 to move into or out of a human patient as part of a medical procedure. For example, the medical procedure may include draining fluids, administering fluids to a patient, providing access for medical instruments (e.g., surgical instruments), and the like.

In the example of FIG. 1, second path 110 through the device accommodates the injection or aspiration of fluid with respect to a human patient. The movement of fluid through second path 110 is controlled by a separate device or system, such as a bladder, a syringe, a pump, or other fluid control system.

The removable needle portion 104 may include any type of needle appropriate for a particular medical procedure. In some embodiments, removable needle portion 104 is attached to housing 102 using a Luermale Luer lock fitting 112. In other embodiments, Luer fitting 112 may allow attachment of a needle or any other object to the end of device 100. As discussed herein, needle portion 104 may accommodate both catheter 108 and fluid from second path 110 traveling through needle portion 104 simultaneously.

Figure 2:
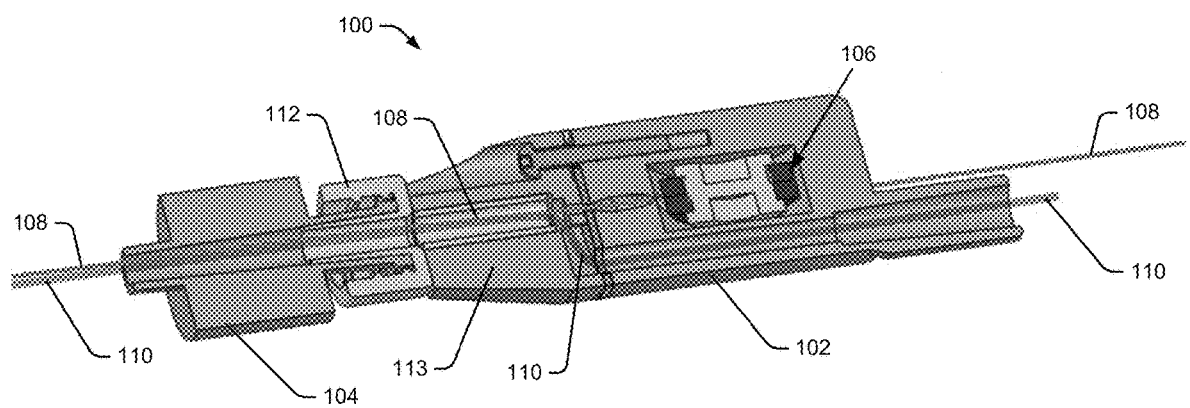
FIG. 2 depicts a cut away view of an embodiment of the handheld device of FIG. 1.

FIG. 2 depicts a cut away view of an embodiment of handheld device 100 of FIG. 1. The example of FIG. 2 illustrates a first path (e.g., lumen) followed by catheter 108 as it passes through device 100 via the first path. FIG. 2 further illustrates the second path 110 (e.g., a lumen for fluids) as it passes through device 100. As shown on the right side of FIG. 2, the first path followed by catheter 108 and second path 110 enter device 100 at different locations. As shown on the left side of FIG. 2, the two paths are combined into a single path such that the fluid may be flowing through device 100 adjacent to catheter 108 in the single path. In some embodiments, the fluid and catheter 108 may travel into needle portion 104 or any other object attached to the end of device 100.

In the example of FIG. 2, catheter 108 contacts catheter controller 106 as it passes through device 100. Thus, when catheter controller 106 is operated by a user, it causes catheter 108 to move along the illustrated path in a forward or backward direction depending on the direction of movement of catheter controller 106 by the user.

Figure 3A:
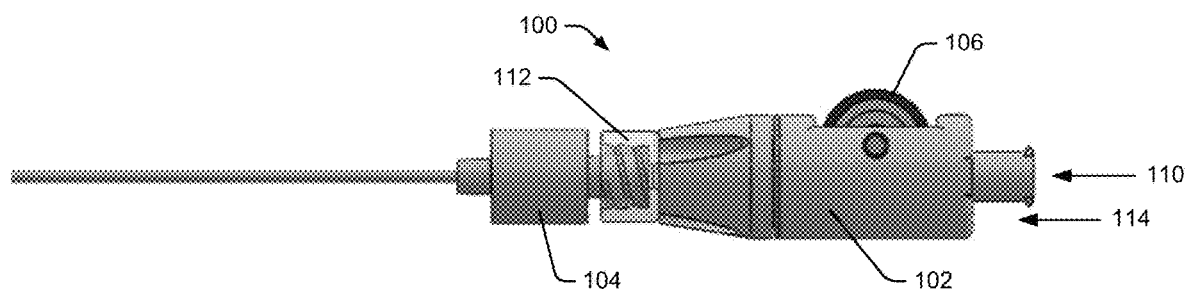
FIG. 3A depicts a side view of an embodiment of the handheld device of FIG. 1.

FIG. 3A depicts a side view of an embodiment of handheld device 100 of FIG. 1. As shown in FIG. 3A, device 100 includes second path 110 for fluid passing through device 100 and an entry or exit path 114 for catheter 108. Additionally device 100 includes a Luer fitting 112 for attaching needle portion 104 or any other object to the end of device 100.

Figure 3B:
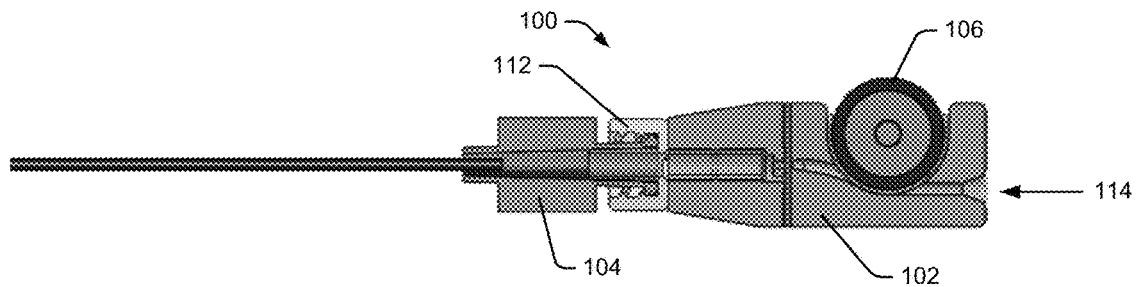
FIG. 3B depicts a cut away side view of an embodiment of the handheld device of FIG. 1.

FIG. 3B depicts a cut away side view of an embodiment of handheld device 100 of FIG. 1. As shown in FIG. 3B, the entry or exit path 114 for catheter 108 causes an inserted catheter to engage with catheter controller 106 and continue toward the left side of FIG. 3B and into needle portion 104. Movement of catheter controller 106 causes catheter 108 to move forward or backward through device 100.

FIGS. 4A and 4B depict perspective views of an embodiment of handheld device 100 of FIG. 1. For example, FIGS. 4A and 4B illustrate the two paths 110, 114 at one end of device 100 and a single path 116 (that combines paths 110 and 114) at the opposite end of device 100.

Figure 5:
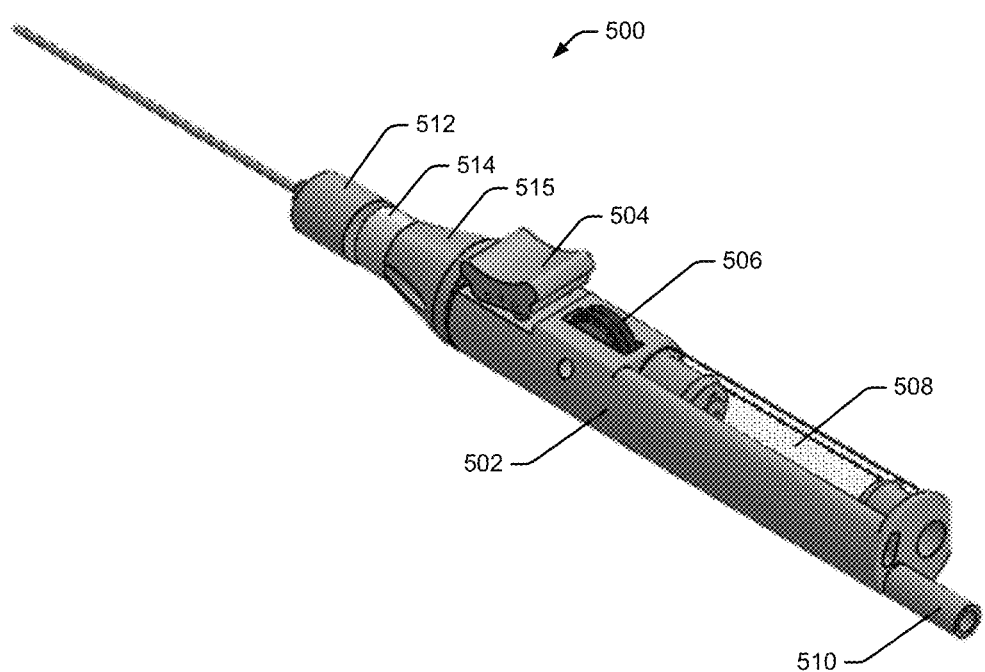
FIG. 5 depicts a perspective view of another embodiment of a handheld device.

FIG. 5 depicts a perspective view of another embodiment of a handheld device 500. In this embodiment, device 500 includes an elastomeric reservoir 508 that allows a user of device 500 to cause fluid to move into or out of device 500 by pressing or releasing elastomeric reservoir 508. For example, the fluid may move out of elastomeric reservoir 508 in response to the user compressing the elastomeric reservoir 508. The material properties or construction of elastomeric reservoir 508 may cause it to return to its original shape after being pressed (or compressed) by the user, which causes fluid to be pulled back into elastomeric reservoir 508. The fluid flow rate is controlled by the speed and/or force of compression applied to elastomeric reservoir 508 for fluid exiting the reservoir. The material properties or construction of elastomeric reservoir 508 determines the fluid flow rate back into the reservoir.

As shown in FIG. 5, device 500 further includes a housing 502, a switch 504, a catheter controller 506, a fluid supply connector 510, a needle portion 512, a Luer fitting 514, and a nose cone 515. In some embodiments, housing 502 is similar to housing 102 discussed above, catheter controller 506 is similar to catheter controller 106 discussed above, needle portion 512 is similar to needle portion 104 discussed above, and Luer fitting 514 is similar to Luer fitting 112 discussed above. In particular implementations, fluid supply connector 510 allows fluid to flow into or out of elastomeric reservoir 508, as described herein. As shown in FIG. 5, nose cone 515 (also referred to as a manifold) may be configured to merge any number of lumens, such as a first lumen, a second lumen, and a third lumen, as discussed herein.

In some embodiments, switch 504 includes multiple positions that control the operation of device 500. For example, if switch 504 is in a first position, squeezing elastomeric reservoir 508 causes fluid from the reservoir to flow into a patient. The first position of switch 504 may be referred to as an "injection position." When switch 504 is in the first position, releasing elastomeric reservoir 508 causes fluid to be drawn through fluid supply connector 510 from an external fluid source into elastomeric reservoir 508. Alternatively, if switch 504 is in a second position, squeezing elastomeric reservoir 508 causes fluid to move through fluid supply connector 510 toward the external fluid source. The second position of switch 504 may be referred to as an "aspiration position." When switch 504 is in the second position, releasing elastomeric reservoir 508 pulls fluid from the patient into elastomeric reservoir 508. In some embodiments, the fluid path (e.g., lumen) in device 500 includes a seal to prevent fluid from following the catheter path after combining the catheter path (e.g., lumen) with the fluid path. This seal prevents fluid from leaking along the path where the catheter path joins the fluid path.

Figure 6A:
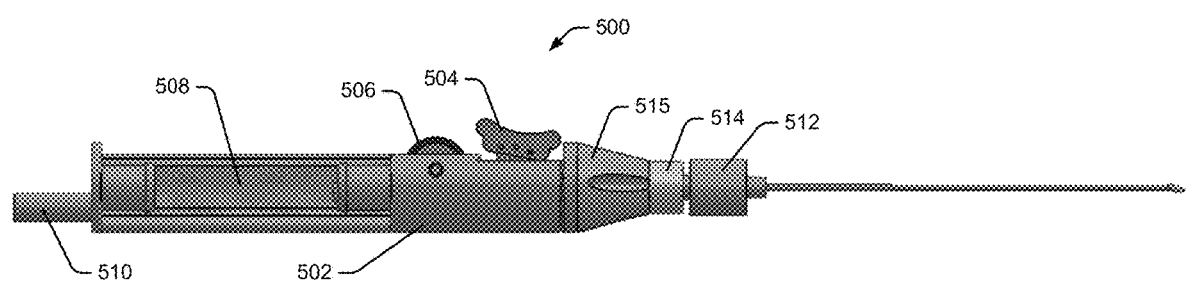
FIGS. 6A and 6B depict side views of an embodiment of the handheld device of FIG. 5.
Figure 6B:
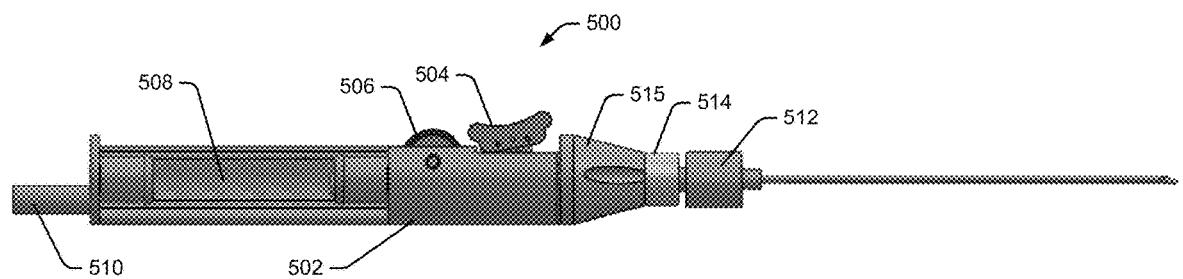

FIGS. 6A and 6B depict side views of an embodiment of handheld device 500 of FIG. 5. FIG. 6A illustrates switch 504 of device 500 in a first position (e.g., an injection position). FIG. 6B illustrates switch 504 of device 500 in a second position (e.g., an aspiration position). Additional details regarding the operation of switch 504 are discussed herein.

Figure 7A:
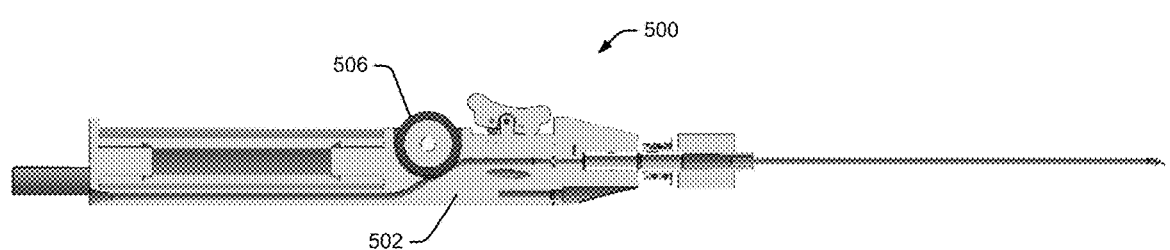
FIGS. 7A and 7B depict side cut away views of an embodiment of the handheld device of FIG. 5.
Figure 7B:
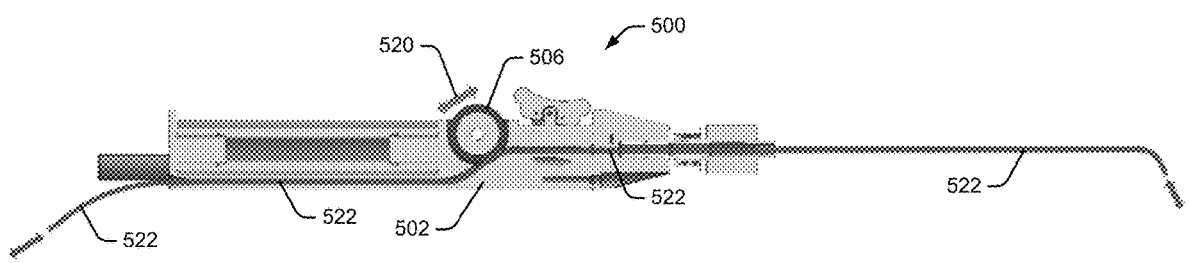

FIGS. 7A and 7B depict side cut away views of an embodiment of handheld device 500 of FIG. 5. FIG. 7A illustrates device 500 without a catheter inserted into device 500. FIG. 7B illustrates device 500 with a catheter 522 passing through device 500. In the example of FIG. 7B, catheter 522 enters device 500 on the left side (as oriented in FIG. 7B), passes through device 500, and exits at the right side (as oriented in FIG. 7B). In the example of FIG. 7B, catheter 522 passes through a needle and exits the end of the needle at the far right side (as oriented in FIG. 7B). In other embodiments, catheter 522 may pass through any type of device, attachment, and the like.

As further shown in FIG. 7B, the outer surface of catheter controller 506 engages with the outer surface of catheter 522. As catheter controller 506 is moved (e.g., rotated) in either direction (as indicated by movement arrow 520), catheter 522 moves forward or backwards through device 500 accordingly.

Figure 8A:
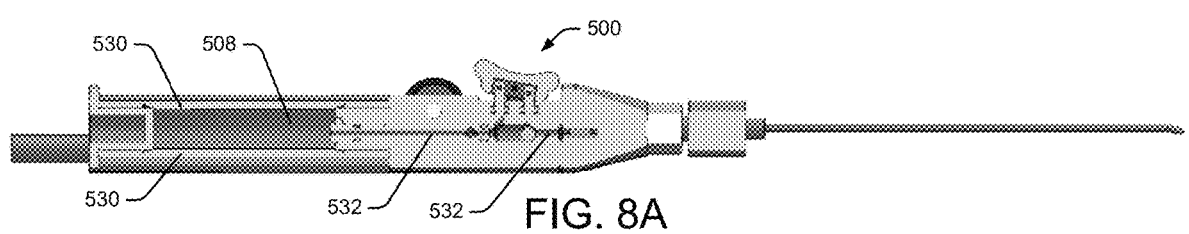
FIGS. 8A-8C depict cut away views of an embodiment of the handheld device of FIG. 5.
Figure 8B:
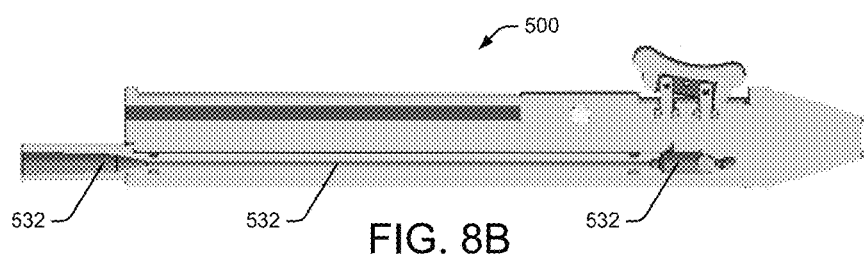
Figure 8C:
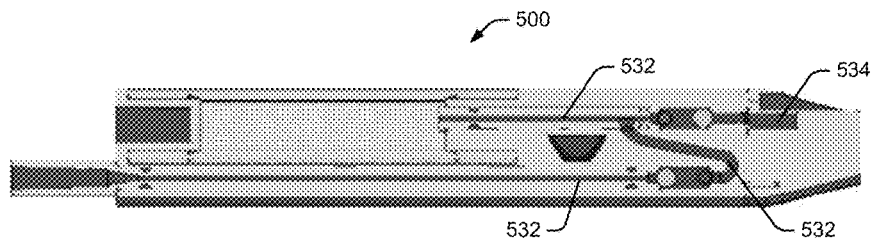

FIGS. 8A, 8B, and 8C depict cut away views of an embodiment of handheld device 500 of FIG. 5. FIGS. 8A and 8B illustrate a cross-sectional views where the cross-section is parallel to the side view. FIG. 8A illustrates walls 530 of reservoir 508 and illustrates a fluid path 532 (e.g., lumen) through device 500. FIG. 8B illustrates a different part of the fluid path 532 through device 500. FIG. 8C illustrates a cross-sectional view where the cross-section is through the valves (discussed herein). FIG. 8C illustrates fluid paths 532 through device 500 and a fluid path 534 (e.g., lumen) to a needle or other attached component.

Figure 9A:
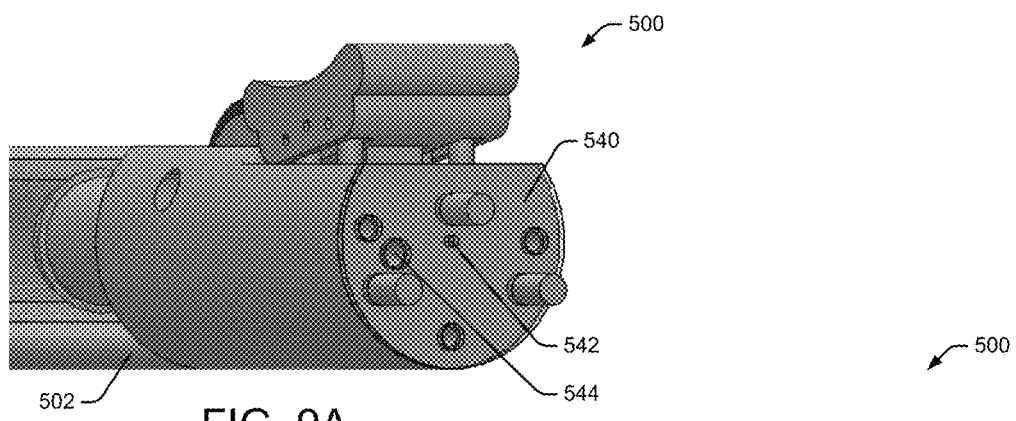
FIGS. 9A-9C depict partial perspective views of an embodiment of the handheld device of FIG. 5.
Figure 9B:
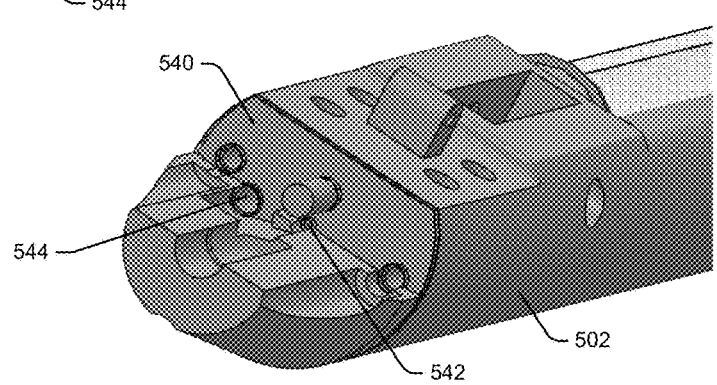
Figure 9C:
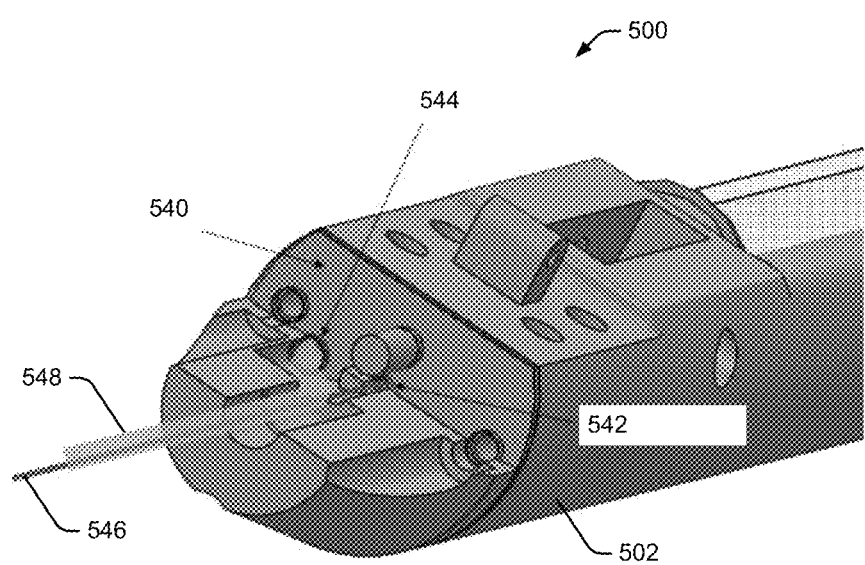

FIGS. 9A, 9B, and 9C depict partial perspective views of an embodiment of handheld device 500 of FIG. 5. FIG. 9A illustrates a portion of housing 502 associated with device 500 with nose cone 515 removed. A gasket 540 provides a seal between housing 502 and nose cone 515. Gasket 540 has an opening 542 through which catheter 522 (see FIG. 7B) travels. Gasket 540 provides a tight fit with catheter 522 to prevent fluid from flowing backwards along catheter 522. An opening 544 allows fluids traveling along a fluid path in device 500 to pass through gasket 540. FIG. 9B illustrates a portion of housing 502 associated with device 500 with a cut away portion of the nose cone.

FIG. 9C illustrates the joining of a catheter path 546 with a fluid path 548. As discussed herein, after joining catheter path 546 and fluid path 548, both catheter 522 and the fluids travel through the same path simultaneously. Thus, catheter 522 and the fluids can exit the end of device 500 simultaneously through a needle or other attached component.

Figure 10A:
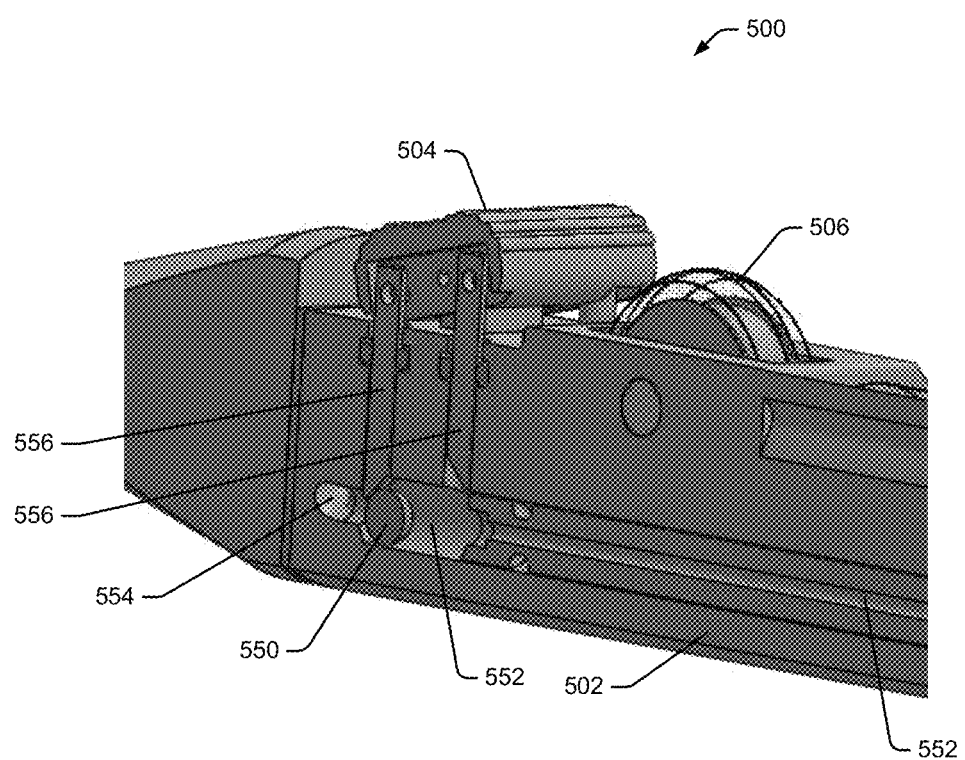
FIG. 10A depicts a partial perspective cut away view of an embodiment of the handheld device of FIG. 5.

FIG. 10A depicts a partial perspective cut away view of an embodiment of handheld device 500 of FIG. 5. As shown in FIG. 10A, device 500 includes housing 502, switch 504, and catheter controller 506 as discussed herein. Also shown in FIG. 10A is sealing ball 550, a fluid path 552, a fluid path 554 to the reservoir (not shown), and disruptor pins 556. Sealing ball 550 can be constructed from metal (e.g., stainless steel or titanium), plastic (e.g., nylon, ABS, or polypropylene), an elastomer (e.g., TPE, silicone, or nitrile), and the like.

Figure 10B:
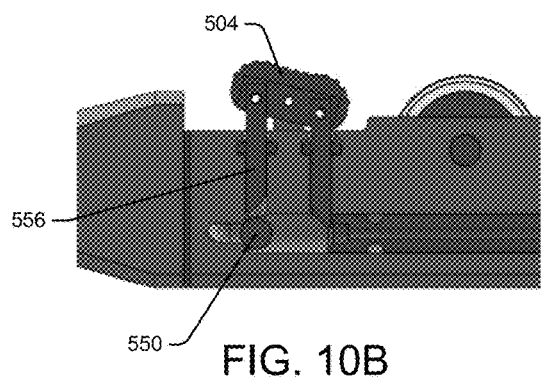
FIGS. 10B-10E depict partial side cut away views of an embodiment of the handheld device of FIG. 5.
Figure 10C:
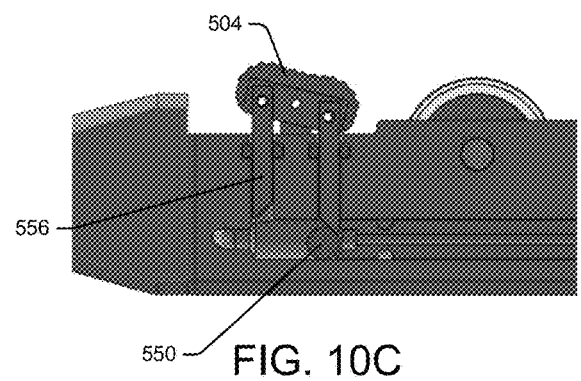

FIGS. 10B-10E depict side cut away views of an embodiment of handheld device 500 of FIG. 5. FIG. 10C represents switch 504 in the aspirate position. In the example of FIG. 10C, fluid is moving from left to right. FIG. 10B represents switch 504 in the aspirate position when the fluid is moving from right to left.

Figure 10D:
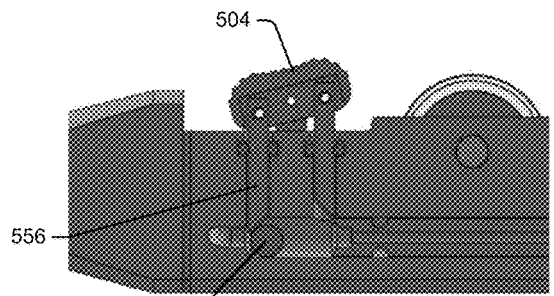
Figure 10E:
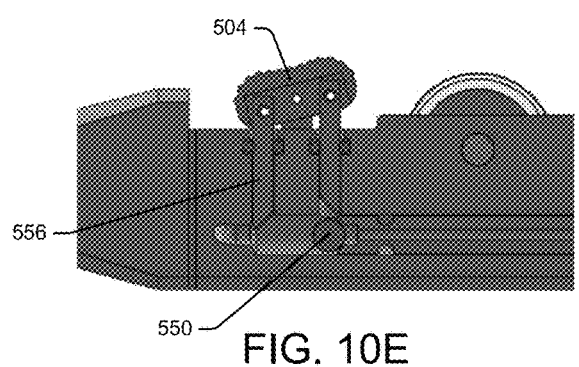

FIG. 10E represents switch 504 in the injection position when the fluid is moving from left to right. FIG. 10D represents switch 504 in the injection position when the fluid is moving from right to left.

Additional details regarding the operation of switch 504, sealing ball 550, and other components shown in FIGS. 10A-10E are discussed below.

Figures 11A, 11B, 11C:
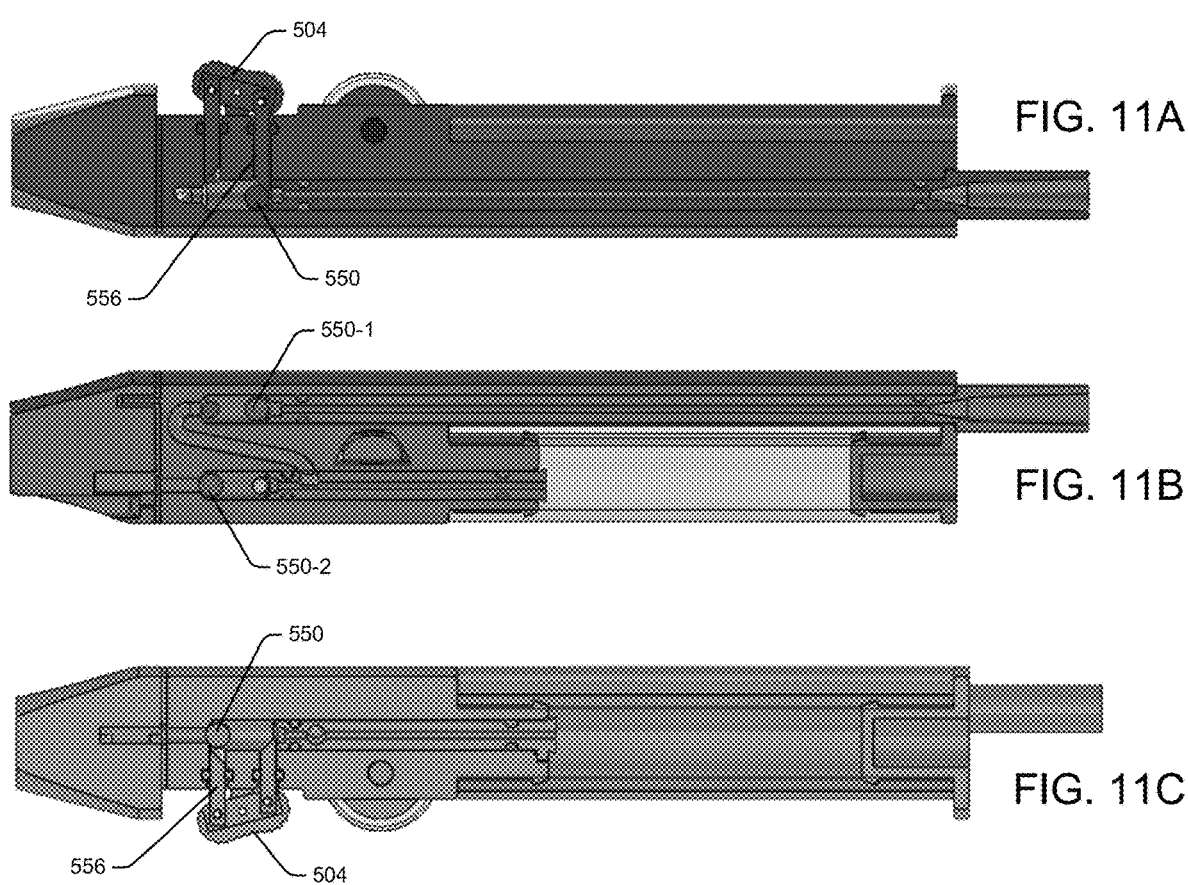
FIGS. 11A-11C depict a cut away view of an embodiment of the handheld device of FIG. 5.

FIGS. 11A-11C depict a cut away view of an embodiment of the handheld device of FIG. 5. FIG. 11A shows a cross-section of the valve (and switch) to/from the fluid source. FIG. 11B shows a cross-section of the fluid paths and valves. FIG. 11C shows a cross-section of the valve (and switch) to/from the needle.

In some embodiments, an upper valve shown in FIG. 11B leads to a fluid source to the right and a lower valve shown in FIG. 11B leads to a needle to the left. The upper valve is also shown in FIG. 11A and may be referred to as a "fluid source valve" or a "second lumen valve." The lower valve is also shown in FIG. 11C may be referred to as a "needle valve" or a "third lumen valve."

In the example of FIG. 11A, switch 504 is in the aspirate position and the reservoir is being squeezed (e.g., compressed) and its volume is decreasing. The right disruptor pin 556 is preventing sealing ball 550-1 from sealing the fluid path to the right. As shown in FIG. 11B, the top sealing ball 550-1 is prevented from sealing the fluid path, but the bottom sealing ball 550-2 is blocking the fluid flow. As shown in FIG. 11C, sealing ball 550-2 is blocking the fluid flow because disruptor pin 556 is not blocking sealing ball 550-2 from blocking the path to the left. Thus, compressing the reservoir pushes sealing ball 550-2 to seal the needle outlet and pushes fluid out the fluid source where disruptor pin 556 is preventing sealing ball 550-1 from sealing that path.

Figure 12A:
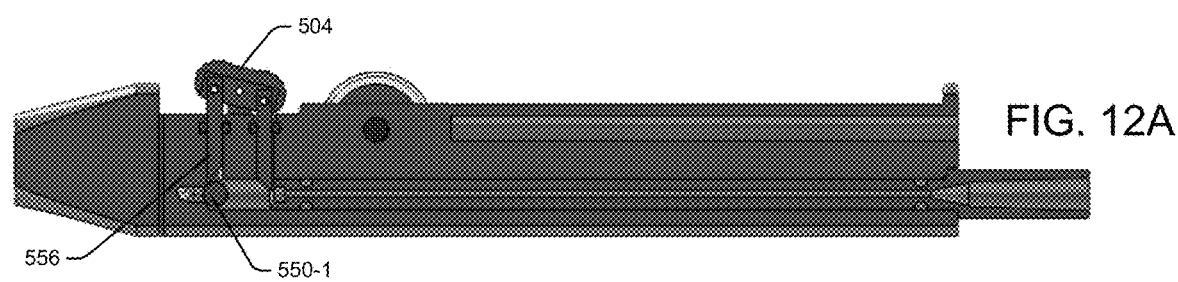
FIGS. 12A-12C depict a cut away view of an embodiment of the handheld device of FIG. 5.
Figure 12B:
Figure 12C:
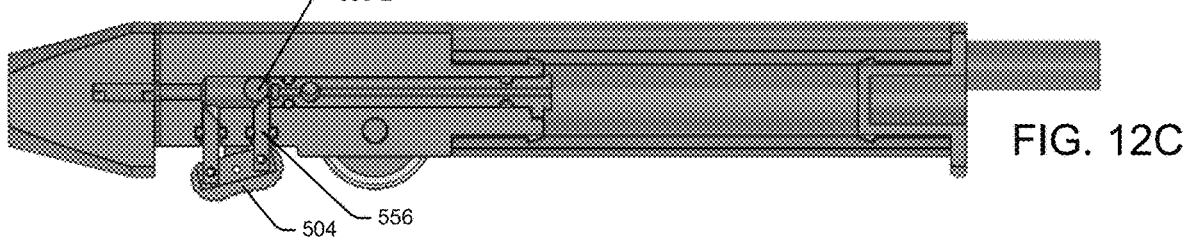

FIGS. 12A-12C depict a cut away view of an embodiment of the handheld device of FIG. 5. FIG. 12A shows a cross-section of the valve (and switch) to/from the fluid source. FIG. 12B shows a cross-section of the fluid paths and valves. FIG. 12C shows a cross-section of the valve (and switch) to/from the needle.

In the example of FIG. 12A, switch 504 is in the aspirate position and the compression of the reservoir has stopped and has been released by the user, so the reservoir is recovering or rebounding (e.g., returning to its uncompressed shape) and increasing in volume. Releasing the pressure on the reservoir causes sealing ball 550-1 to be pulled to the left against the sealing face.

As shown in FIG. 12B, the top sealing ball 550-1 is sealing the fluid path, but the bottom sealing ball 550-2 is not sealing the fluid path. As shown in FIG. 12C, sealing ball 550-2 is not blocking the fluid flow because disruptor pin 556 is blocking sealing ball 550-2. This combination of ball positions forces fluid to enter the reservoir through the needle path.

Figures 13A, 13B, 13C:
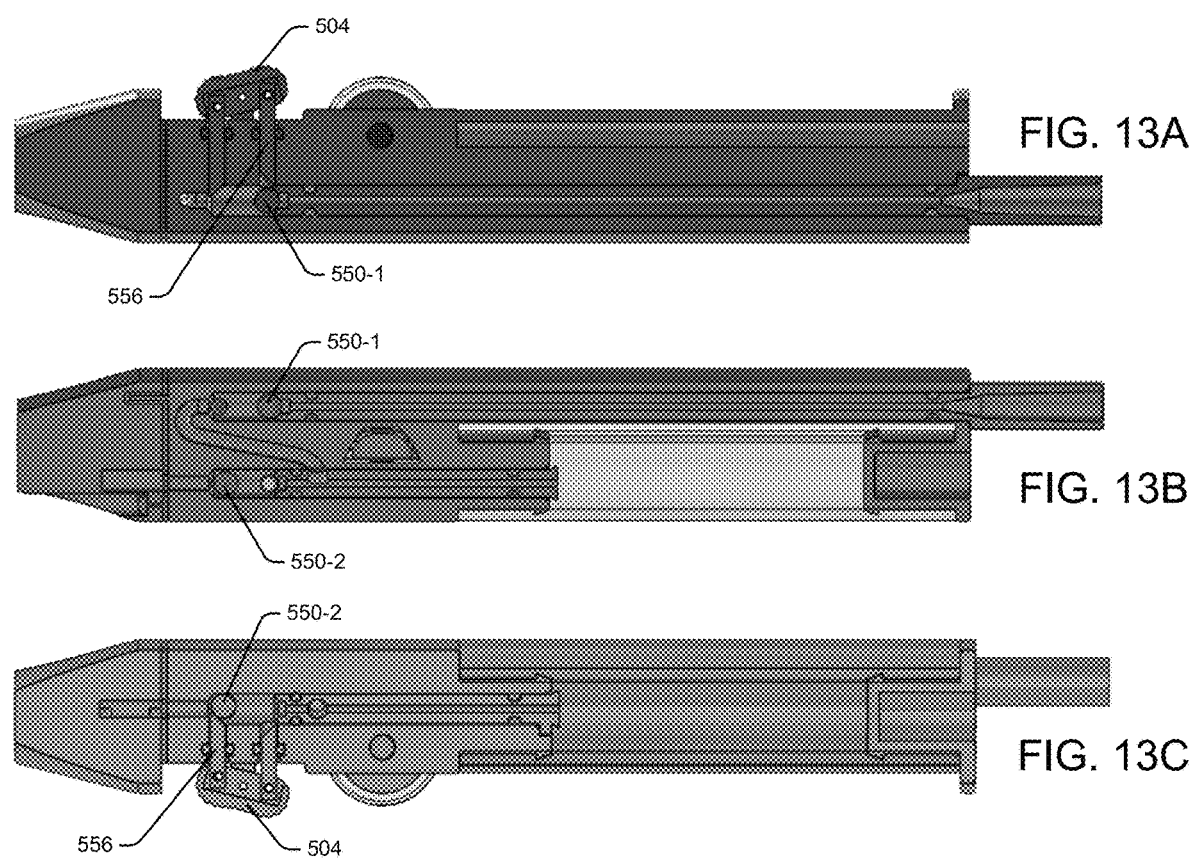
FIGS. 13A-13C depict a cut away view of an embodiment of the handheld device of FIG. 5.

FIGS. 13A-13C depict a cut away view of an embodiment of the handheld device of FIG. 5. FIG. 13A shows a cross-section of the valve (and switch) to/from the fluid source. FIG. 13B shows a cross-section of the fluid paths and valves. FIG. 13C shows a cross-section of the valve (and switch) to/from the needle.

In the example of FIG. 13A, switch 504 is in the injection position and the reservoir is being squeezed (e.g., compressed). The right disruptor pin 556 is not preventing sealing ball 550-1 from sealing the fluid path to the right. As shown in FIG. 13B, the top sealing ball 550-1 is prevented from sealing the fluid path, but the bottom sealing ball 550-2 is blocking the fluid flow. As shown in FIG. 13C, sealing ball 550-2 is not blocking the fluid flow because disruptor pin 556 is blocking sealing ball 550-2 from reaching the sealing face to its left. Thus, compressing the reservoir pushes sealing ball 550-1 to seal the path to the fluid source and pushes fluid out the needle where disruptor pin 556 is preventing sealing ball 550-2 from sealing that path to the needle.

FIGS. 14A-14C depict a cut away view of an embodiment of the handheld device of FIG. 5. FIG. 14A shows a cross-section of the valve (and switch) to/from the fluid source. FIG. 14B shows a cross-section of the fluid paths and valves. FIG. 14C shows a cross-section of the valve (and switch) to/from the needle.

In the example of FIG. 14A, switch 504 is in the injection position and the compression of the reservoir has stopped and has been released by the user, so the reservoir is recovering (e.g., returning to its uncompressed shape). Releasing the pressure on the reservoir causes sealing ball 550-1 to be pulled to the left, but not block the fluid flow because disruptor pin 556 is blocking sealing ball 550-1 from reaching its sealing face.

As shown in FIG. 14B, the top sealing ball 550-1 is not sealing the fluid path to the fluid supply, but the bottom sealing ball 550-2 is sealing the fluid path to the needle. As shown in FIG. 14C, sealing ball 550-2 is blocking the fluid flow because disruptor pin 556 is not blocking sealing ball 550-2. This combination of ball positions forces fluid to enter the reservoir through the fluid supply path.

Figure 15A:
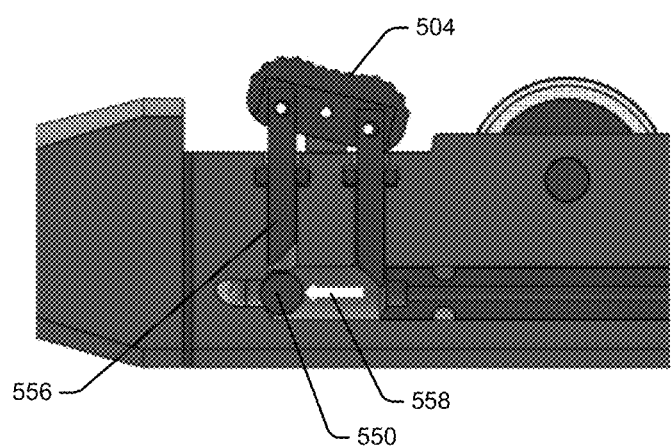
FIGS. 15A and 15B depict a partial cut away view of an embodiment of the handheld device of FIG. 5.
Figure 15B:
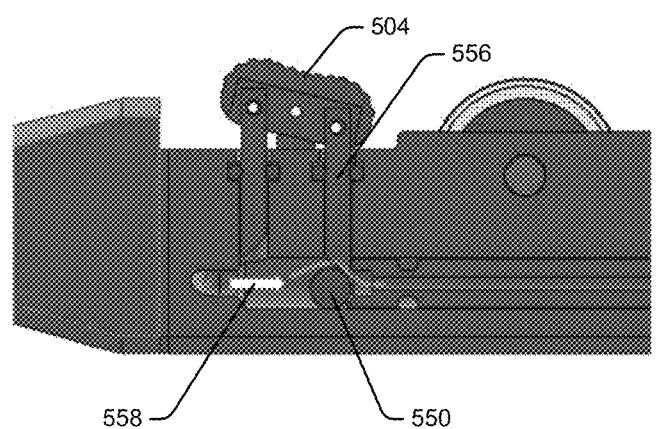

FIGS. 15A and 15B depict a cut away view of an embodiment of the handheld device of FIG. 5. In the example of FIGS. 15A and 15B, switch 504 is in the aspirate position. As shown in FIG. 15A, when fluid moves to the left as indicated by arrow 558, this fluid movement causes sealing ball 550 to move to the left until it seals the smaller opening. For example, the smaller opening may have a circular edge forming a sealing face that allows sealing ball 550 to seal against the edge and stop fluid flow to the left. Sealing ball 550 can seal the smaller opening because left disruptor pin 556 is not blocking sealing ball 550 from reaching the left side sealing face. Sealing ball 550 maintains the sealing position against the sealing face because the pressure on the left side of sealing ball 550 is less than the pressure on the right side of sealing ball 550.

As shown in FIG. 15B, when fluid moves to the right as indicated by arrow 558, sealing ball 550 moves to the right until it is stopped by the right disruptor pin 556. Since the right disruptor pin 556 is positioned to the left of the right side sealing face, it disrupts (e.g., prevents) sealing ball 550 from sealing against the sealing face, thereby allowing fluid to flow to the right (flowing past sealing ball 550).

Figure 16A:
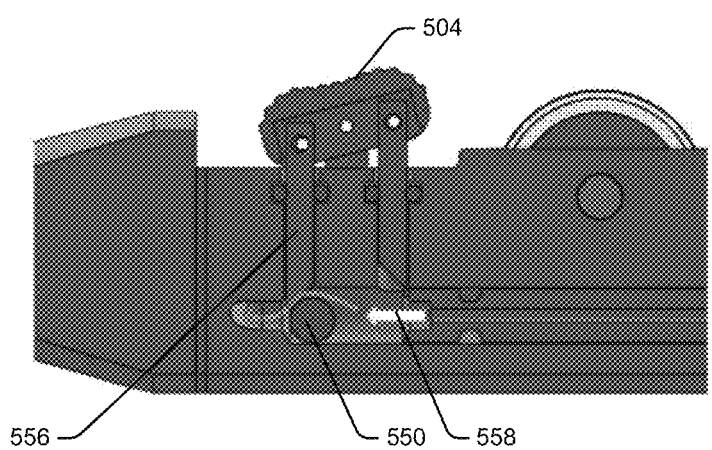
FIGS. 16A and 16B depict a partial cut away view of an embodiment of the handheld device of FIG. 5.
Figure 16B:
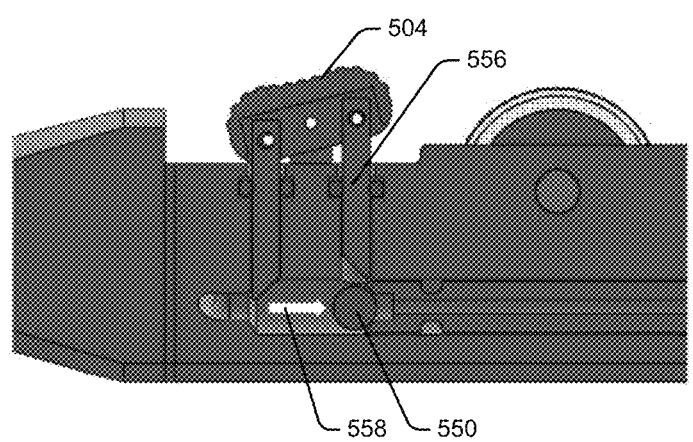

FIGS. 16A and 16B depict a cut away view of an embodiment of the handheld device of FIG. 5. In the example of FIGS. 16A and 16B, switch 504 is in the injection position. As shown in FIG. 16A, when fluid moves to the left as indicated by arrow 558, this fluid movement causes sealing ball 550 to move to the left until it is stopped by left disruptor pin 556. The left disruptor pin 556 is positioned to the right of the sealing face such that sealing ball 550 cannot seal against the sealing face, thereby allowing fluid to continue flowing to the left.

As shown in FIG. 16B, when the fluid moves to the right as indicated by arrow 558, sealing ball 550 moves to the right until it is stopped by a sealing face to the right of sealing ball 550, thereby causing sealing ball 550 to seal against the sealing face and prevent fluids from flowing past sealing ball 550. Sealing ball 550 stays in this position because the pressure on the left side of sealing ball 550 is greater than the pressure on the right side of sealing ball 550.

Figure 17:
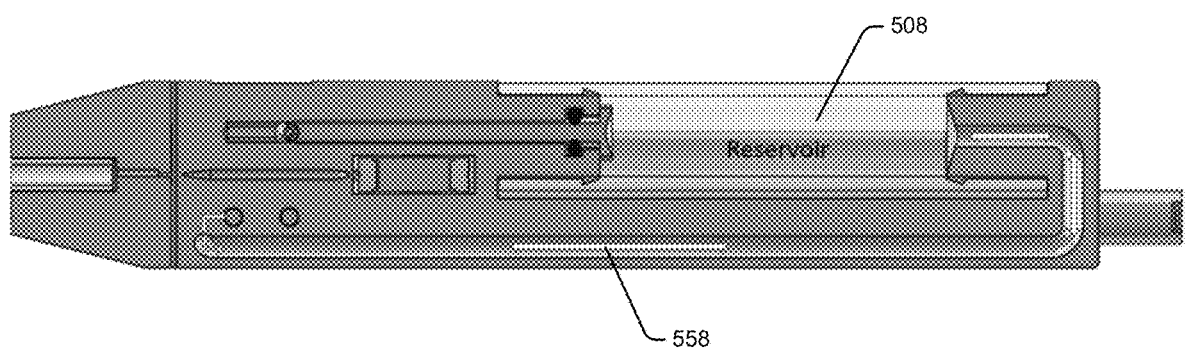
FIG. 17 depicts a cut away view of an embodiment of the handheld device of FIG. 5.

FIG. 17 depicts a cut away view of an embodiment of the handheld device of FIG. 5 with an alternate fluid flow path between the reservoir and the fluid supply. In the example of FIG. 17, the flow path is shown by two-way arrows 558. In the case of fluid moving from reservoir 508 to the flid supply, the fluid flows from the proximal end of reservoir 508 to the valve, and then proximally to the fluid supply (not shown). In the case of fluid moving from the fluid supply to reservoir 508, the fluid moves distally from the fluid supply (not shown), through the valve, and then into the proximal end of reservoir 508. In some embodiments, this reservoir filling and draining path may be more intuitive to a user with fluid flowing to/from the fluid supply through the proximal end of reservoir 508 (e.g., the end to which the fluid supply is connected).

Figure 18:
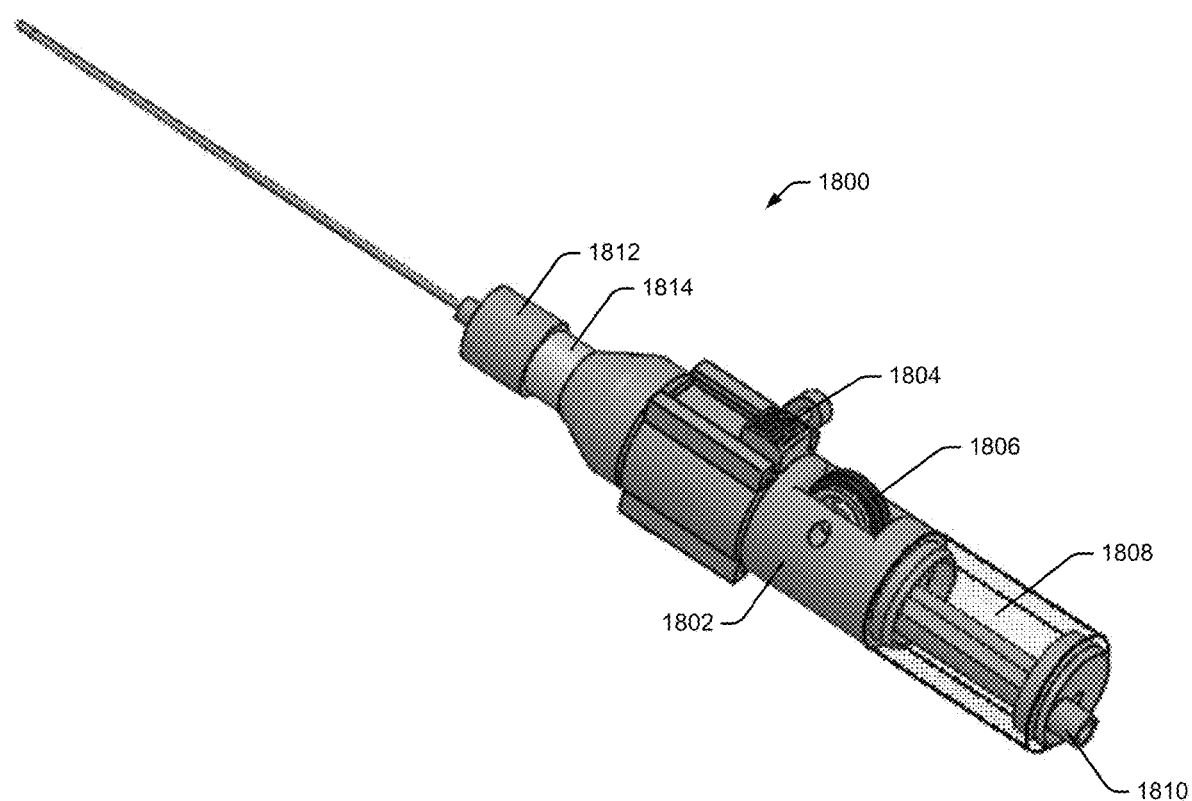
FIG. 18 depicts a perspective view of another embodiment of a handheld device.

FIG. 18 depicts a perspective view of another embodiment of a handheld device 1800. In the embodiment of FIG. 18, device 1800 includes a different type of valve/switch 1804 that may be referred to as a magnetic valve. Device 1800 includes a housing 1802, switch 1804, a catheter controller 1806, a reservoir 1808, a fluid supply connector 1810, a needle portion 1812, and a Luer fitting 1814. Some of the portions of device 1800 are similar to device 500 discussed herein. Switch 1804 is a magnetic switch that operates as described in greater detail herein.

Figure 19:
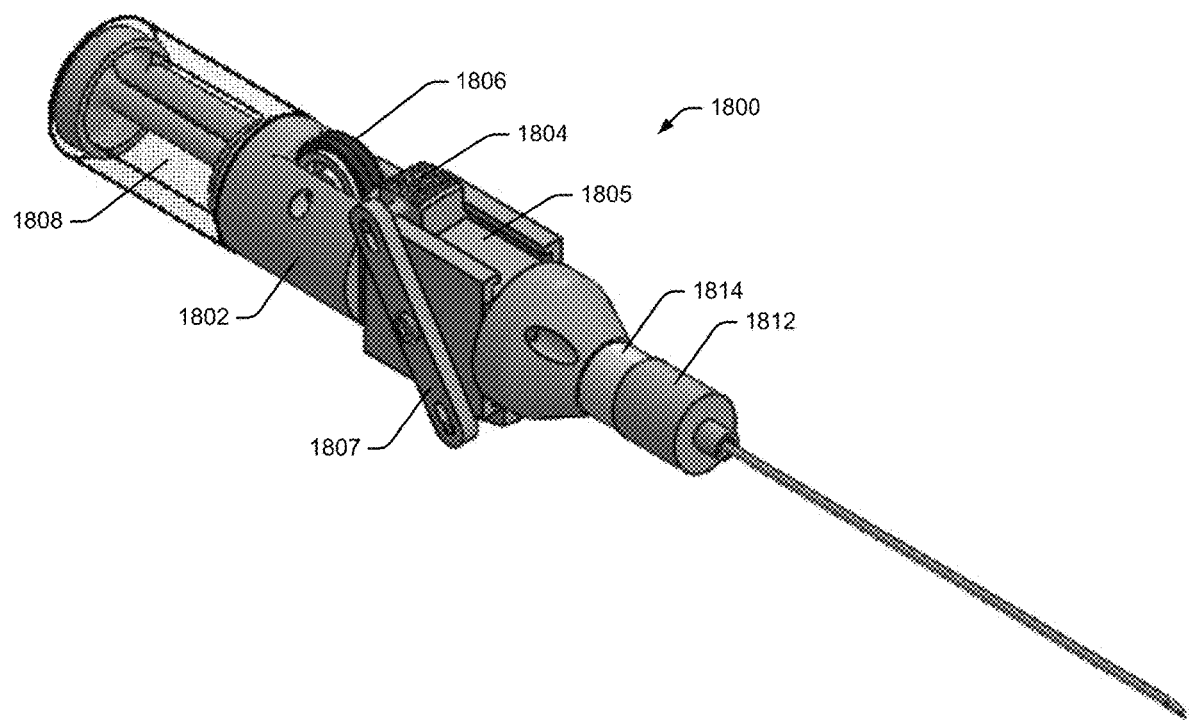
FIG. 19 depicts another perspective view of an embodiment of the handheld device of FIG. 18.

FIG. 19 depicts another perspective view of an embodiment of the handheld device of FIG. 18. Switch 1804 slides within a channel 1805 from a first position to a second position (e.g., from an injection position to an aspiration position). As discussed herein, switch 1804 includes two or more magnets located at the top and bottom position of switch 1804. A lever arm 1807 connects portions of switch 1804 at the top and bottom of device 1800. Lever arm 1807 pivots in the middle of lever arm 1807 such that the two portions of switch 1804 move in opposite directions simultaneously. For example one portion of switch 1804 may be located at a proximal end of device 1800 and the other portion of switch 1804 is located at the distal end of device 1800. Additional details regarding the operation of switch 1804, channel 1805, and lever arm 1807 are discussed in greater detail herein.

Figure 20:
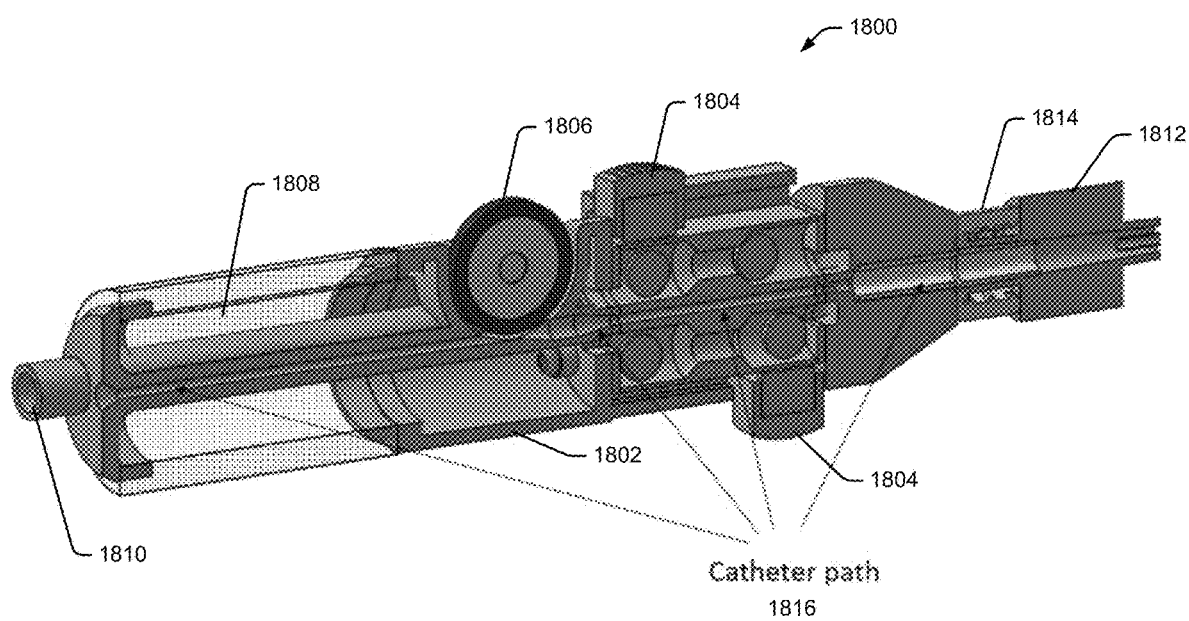
FIG. 20 depicts a cut away view of an embodiment of the handheld device of FIG. 18.

FIG. 20 depicts a cut away view of an embodiment of the handheld device of FIG. 18. In particular, FIG. 20 illustrates a catheter path 1816 (e.g., lumen) through device 1800. As discussed herein, catheter controller 1806 controls the movement of a catheter through device 1800. For example, a user's finger may rotate catheter controller 1806 which is in contact with an external surface of the catheter, thereby causing the catheter to move in a forward or backward direction through device 1800.

Figure 21A:
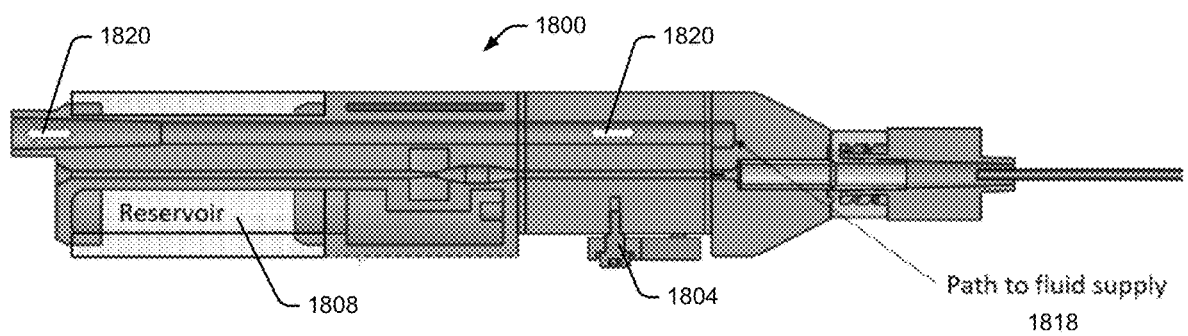
FIGS. 21A and 21B depict cut away views of an embodiment of the handheld device of FIG. 18.
Figure 21B:
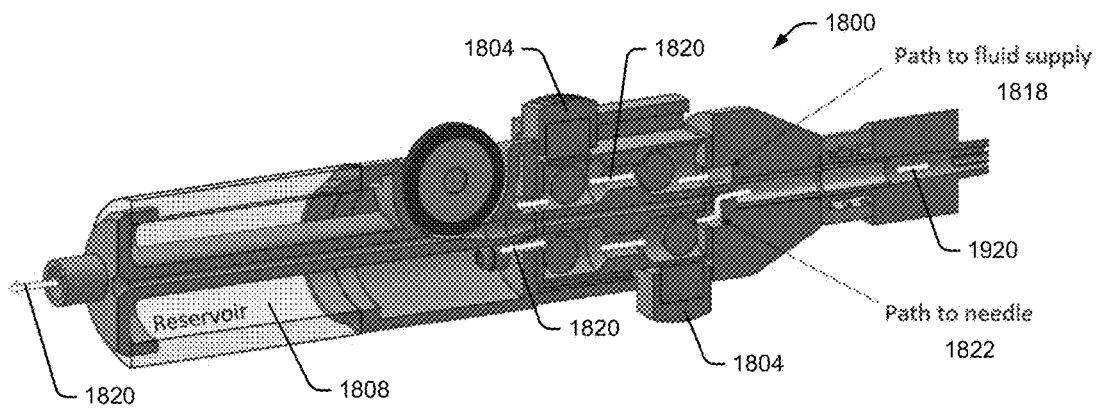

FIGS. 21A and 21B depict cut away views of an embodiment of the handheld device of FIG. 18. In particular, FIGS. 21A and 21B illustrate a path 1818 to a fluid supply that runs through device 1800. FIG. 21A illustrates a cross-section parallel to the top view and FIG. 21B illustrates a cross-section parallel to the side view. In the example of FIG. 21A, arrows 1820 show directions of fluid flow through device 1800.

In the example of FIG. 21B, arrows 1820 also show directions of fluid flow through device 1800. Additionally, a path 1822 (e.g., lumen) is shown to the needle or other component attached to device 1800.

Figure 22:
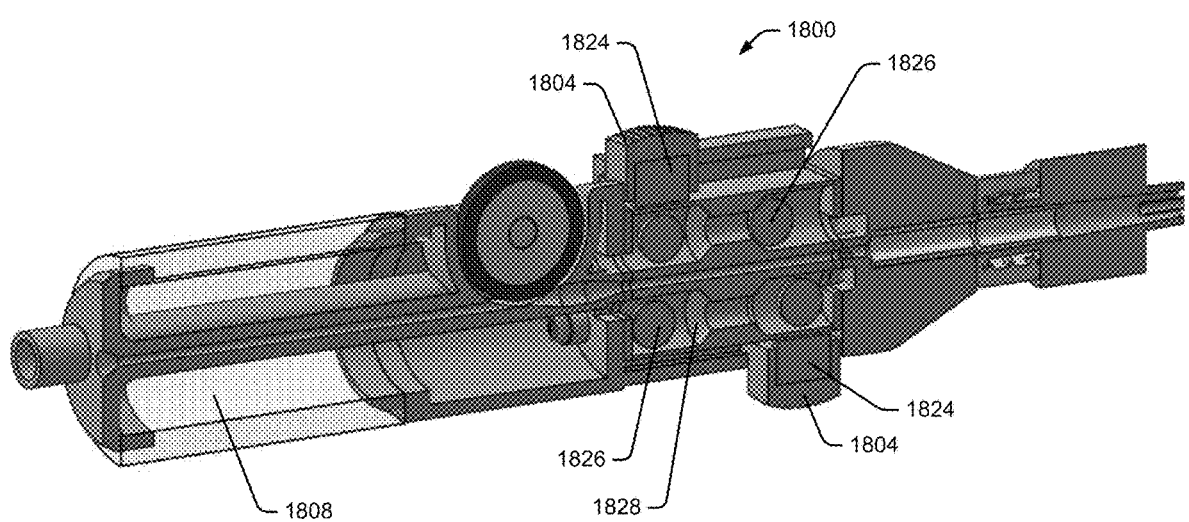
FIG. 22 depicts a cut away view of an embodiment of the handheld device of FIG. 18.

FIG. 22 depicts a cut away view of an embodiment of the handheld device of FIG. 18. In the example of FIG. 22, device 1800 is shown when reservoir 1808 is recovering (e.g., pressure has been released from reservoir 1808). As shown in FIG. 22, switch portions 1804 each include a magnet 1824. Device 1800 also includes four ferromagnetic spheres 1826, where each sphere 1826 is positioned in a separate channel. Ferromagnetic spheres 1826 can be constructed from any ferromagnetic material, such as 17-4 ph or 400-series stainless steels. As shown in FIG. 22, each channel has a sealing face 1828 (also referred to as a valve seat) at one end that has a circular opening capable of being sealed by a particular sphere 1826 in the same channel. Since spheres 1826 are ferromagnetic, magnets 1824 may impact the movement of spheres 1826 within the channels based on the position of each magnet 1824 with respect to each sphere 1826.

Figure 23A:
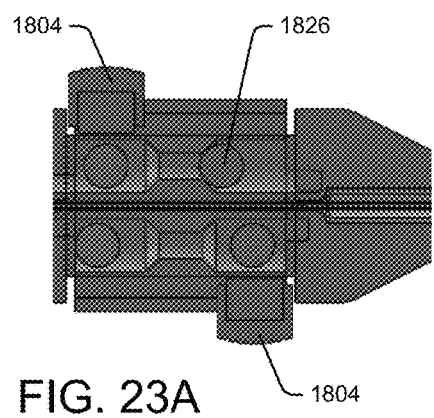
FIGS. 23A-23D depict cut away views of a portion of an embodiment of the handheld device of FIG. 18.
Figure 23B:
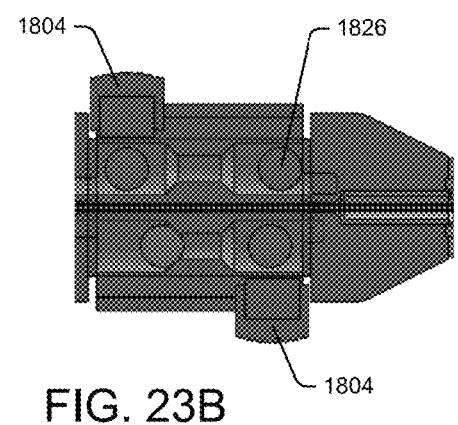
Figure 23C:
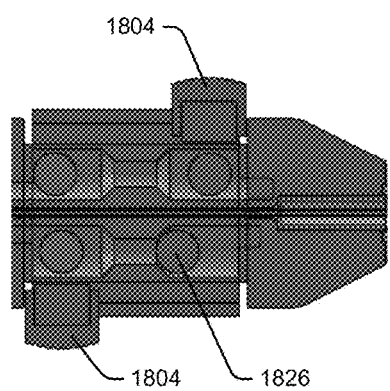
Figure 23D:
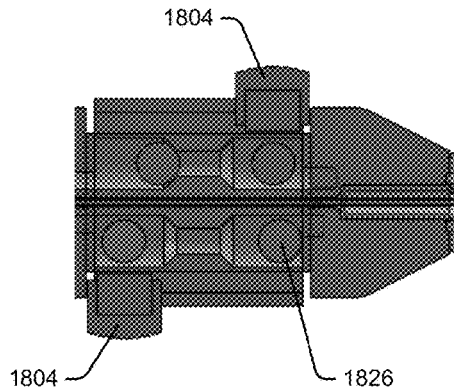

FIGS. 23A-23D depict cut away views of a portion of an embodiment of the handheld device of FIG. 18. As shown in FIGS. 23A-23D, multiple switch 1804 portions and multiple spheres 1826 are shown in different configurations. For example, in FIGS. 23A and 23B, switch 1804 is in the aspirate position. In FIGS. 23C and 23D, switch 1804 is in the injection position. In each of FIGS. 23A-23D, the top half of the structure represents a first valve to the fluid supply and the bottom half of the structure represents a second valve to the needle.

In the examples of FIGS. 23A and 23C, reservoir 1808 is recovering (e.g., pressure has been released from reservoir 1808), which causes fluid to flow from right to left. In the examples of FIGS. 23B and 23D, reservoir 1808 is being compressed, which causes fluid to flow from left to right. As shown in FIGS. 23A-23D, the sphere 1826 closest to the magnet in switch portion 1804 is not free to move (e.g., the magnet holds the sphere 1826 close to the magnet). But the spheres 1826 that are not close to a magnet can move within their channel (e.g., toward or away from the sealing face).

Figure 24:
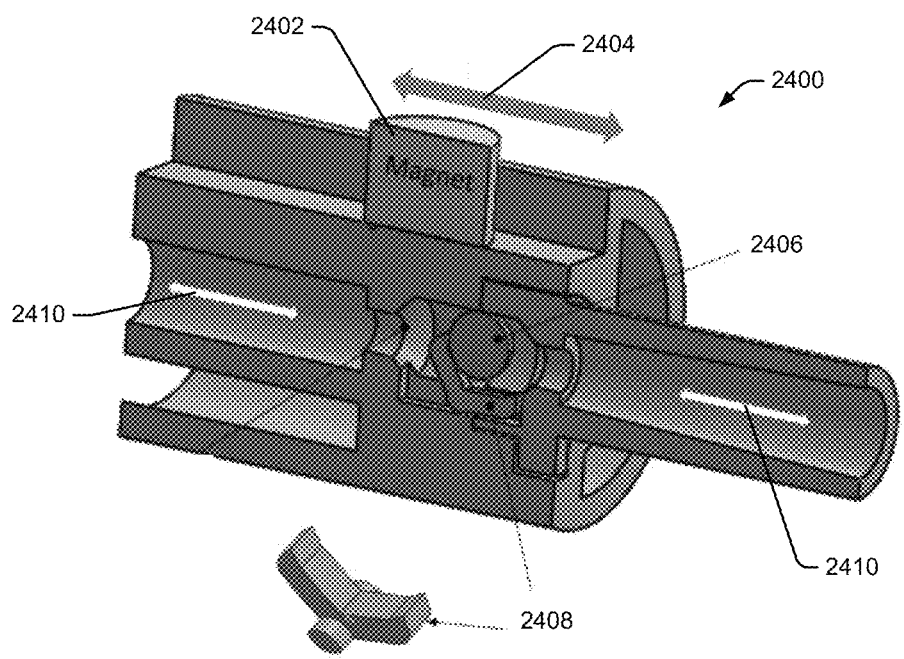
FIG. 24 depicts a perspective cut away view of another embodiment of a valve mechanism in a handheld device.

FIG. 24 depicts a perspective cut away view of another embodiment of a valve mechanism 2400 in a handheld device. The embodiment of FIG. 24 illustrates a portion of a multi-piece valve system. In the example of FIG. 24, valve mechanism 2400 includes a magnet 2402, a sealing ball 2406, and a ferromagnetic rocking arm 2408. In some embodiments, sealing ball 2406 is made from a non-ferromagnetic material, such as nylon, silicone, nitrile, ABS, 300-series stainless steel, titanium, and the like. As discussed herein, magnet 2402 can slide in the directions shown by arrows 2404 (e.g., from the distal to proximate end and vice versa). Movement of magnet 2402 alters the position of rocking arm 2408. For example, rocking arm 2408 may pivot around a pivot point as magnet 2402 slides in different directions. The pivoting of rocking arm 2408 may control or restrict the movement of sealing ball 2406 within valve mechanism 2400. Depending on the position of sealing ball 2406, fluid may flow through valve mechanism 2400 as shown by arrows 2410.

Figure 25A:
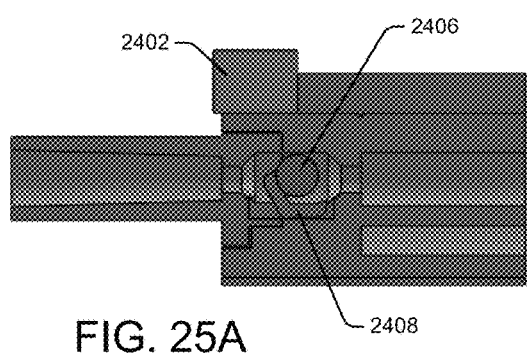
FIGS. 25A-25D depict cut away views of a portion of an embodiment of the valve mechanism of FIG. 24.
Figure 25B:
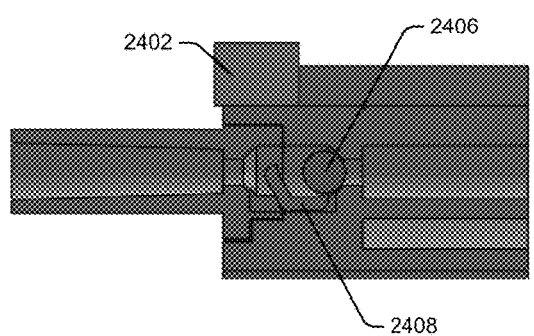
Figure 25C:
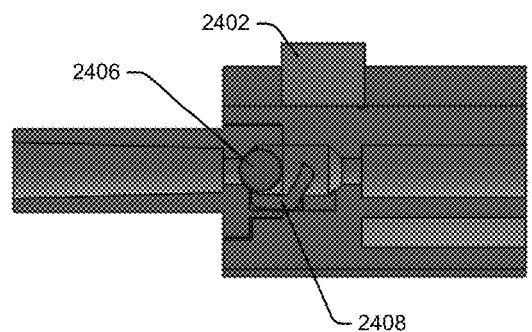
Figure 25D:
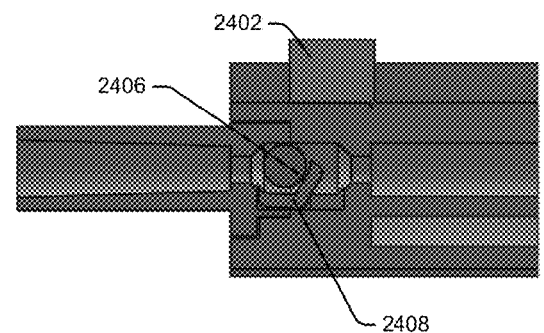

FIGS. 25A-25D depict cut away views of a portion of an embodiment of the valve mechanism of FIG. 24. The examples of FIGS. 25A-25D show various positions of magnet 2402, sealing ball 2406, and rocking arm 2408 during different operating situations associated with valve mechanism 2400. For example, FIGS. 25A and 25B show valve mechanism 2400 with magnet 2402 in the aspirate position. FIGS. 25C and 25D show valve mechanism 2400 with magnet 2402 in the injection position. In the examples of FIGS. 25A and 25C, fluid is moving from right to left. In the examples of FIGS. 25B and 25D, fluid is moving from left to right.

Figure 26C:
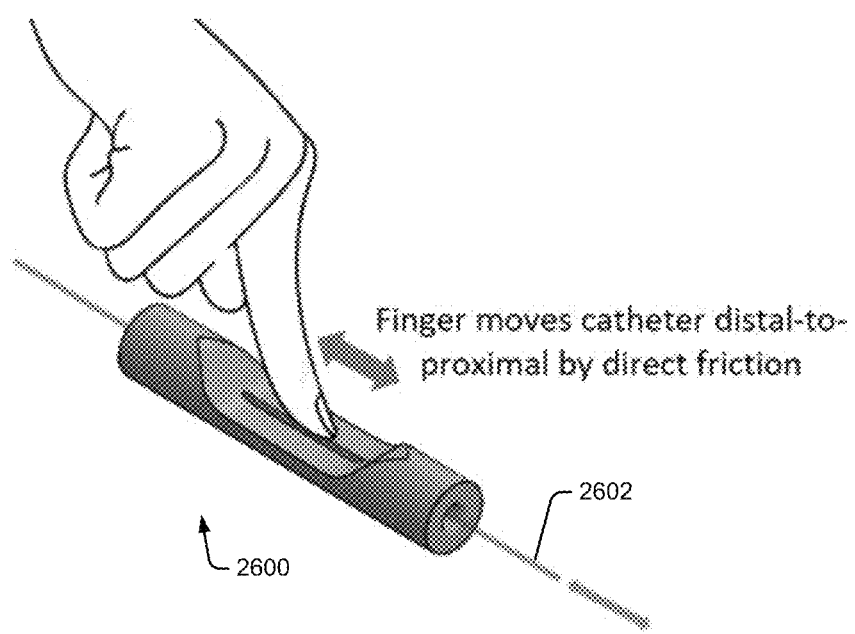

FIGS. 26A-26C depict perspective views of other embodiments of a handheld device 2600. As shown in FIGS. 26A-26C, a user can directly manipulate catheter 2602 by touching the outer surface of catheter 2602 with their finger and moving their finger in the desired direction of movement of catheter 2602. In some embodiments, the example of FIGS. 26A-26C may replace wheel 106 shown in FIG. 1.

FIGS. 27A and 27B depict perspective views of another embodiment of a handheld device 2700. As shown in FIGS. 27A and 27B, a first wheel 2702 engages with an outer surface of a catheter 2706. Additionally, a second wheel 2704 engages with the outer surface of catheter 2706. In this configuration, the second wheel 2704 is on the approximately opposite side of catheter 2706. In this example, movement of first wheel 2702 by a user's finger causes catheter 2706 to move through device 2700. When a user is moving first wheel 2702 to cause movement of catheter 2706, the second wheel 2704 reduces friction to make movement of catheter 2706 easier for the user.

Figure 28:
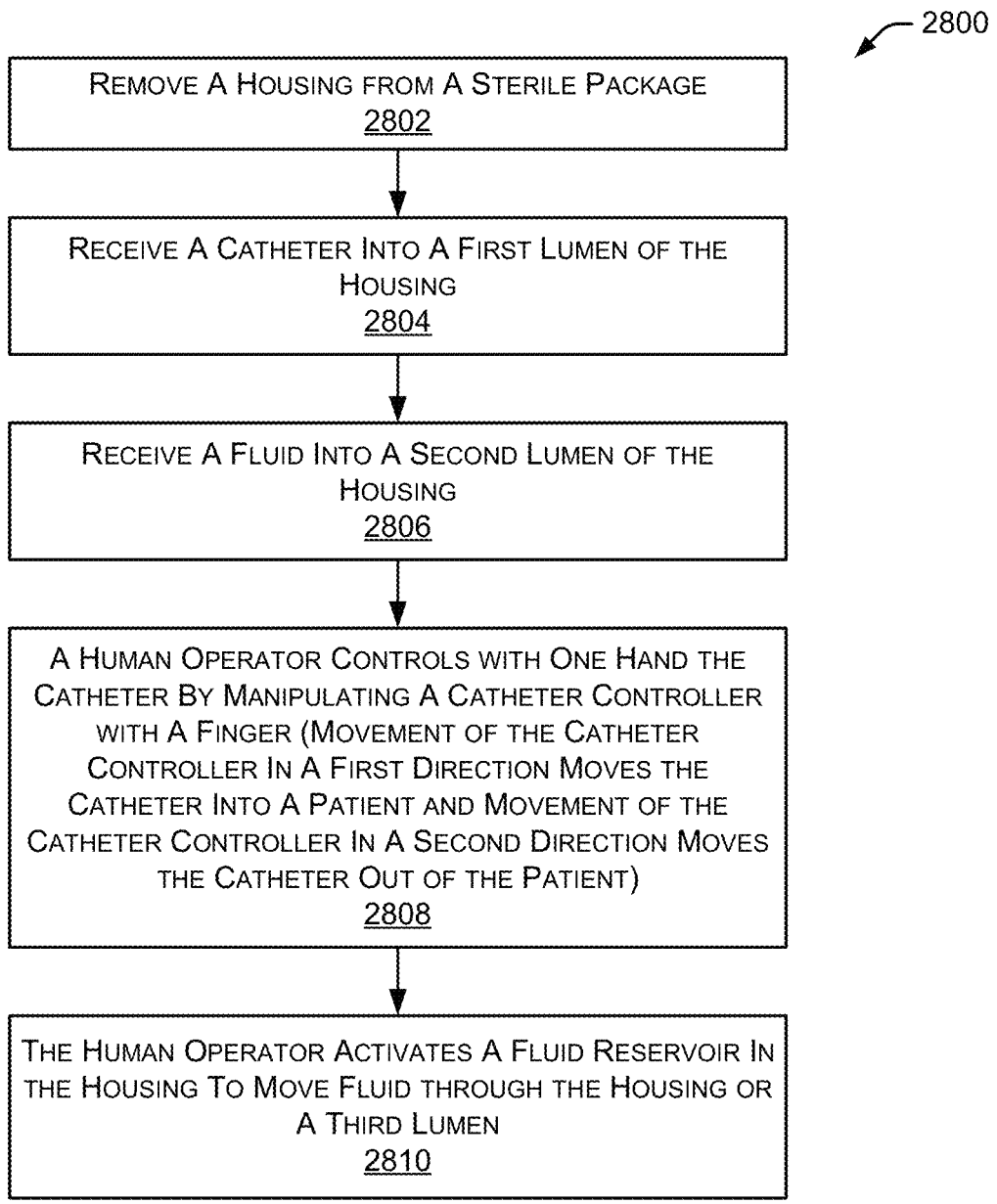
FIG. 28 depicts an embodiment of a method for controlling a catheter.

FIG. 28 depicts an embodiment of a method 2800 for controlling a catheter. Initially, method 2800 removes 2802 a system of the type discussed herein (e.g., a housing) from a sterile package. In some embodiments, the sterile package may include a catheter and other medical tools or supplies. Method 2800 continues as a catheter is received 2804 into a first lumen of the housing and a fluid is received 2806 into a second lumen of the housing.

Method 2800 continues as a human operator controls 2808 the catheter with one hand by manipulating a catheter controller with a finger. In some embodiments, movement of the catheter controller in a first direction moves the catheter into a patient and movement of the catheter controller in a second direction moves the catheter out of the patient. In some examples, both the catheter and fluid may flow through the third lumen simultaneously.

In some implementations, the human operator may activate 2810 a fluid reservoir in the housing to move fluid through the housing or a third lumen.

In some embodiments, the systems and methods described herein can be used with a peripheral nerve block procedure. This procedure targets a particular nerve in a patient to reduce pain associated with the particular nerve. Ultrasound imaging technology may be used to identify an injection site for the peripheral nerve block. The systems and methods discussed herein are then used to perform the peripheral nerve block procedure.

In other embodiments, the systems and methods described herein may be used to thread a catheter (e.g., a nerve block catheter) through a needle. In this situation, the catheter is used to provide an injection of medicine to a target location over a period of time, such as several days. For example, once a needle is inserted in a target location, the systems and methods described herein may thread the catheter through the needle, thereby removing the need for an additional person to thread the catheter through the needle by hand. Instead, the catheter control may be used by the same person using the ultrasound probe and needle to automatically thread the catheter through the needle.

In some implementations, the systems and methods described herein may be implemented in a single handheld device. For example, the single handheld device may allow a single operator to:
- inject a fluid into a patient through a needle that is positioned using an ultrasound probe
- control an injection pressure for a particular injection of a fluid into a patient
- aspirate a fluid out of a patient through a needle that is positioned using an ultrasound probe
- insert a catheter into a patient through a needle that is positioned using an ultrasound probe
- insert electrodes for neuro stimulation through a needle that is positioned using an ultrasound probe While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. An apparatus comprising:
    a housing comprising:
        a first lumen in the housing configured to receive a catheter;
        a second lumen in the housing configured to receive a fluid;
        a third lumen in the housing configured to allow both the catheter and the fluid to pass through the third lumen simultaneously, wherein the catheter enters the housing through a first opening in the housing and exits the housing through a second opening in the housing;

a catheter controller associated with the housing, wherein the catheter controller controls movement of the catheter through the housing; and a manifold associated with the housing, wherein the manifold is configured to merge the first lumen, the second lumen, and the third lumen.

2. The apparatus of claim 1, wherein the housing is configured to support single-handed control of the catheter by a human operator.

3. The apparatus of claim 1, wherein the catheter controller includes at least one of a wheel or a slider capable of control by a human operator.

4. The apparatus of claim 1, wherein the second lumen is configured to receive fluid from a fluid source.

5. The apparatus of claim 1, wherein the catheter controller is configured to control movement of the catheter through a human body.

6. The apparatus of claim 1, wherein the fluid is outside an outer surface of the catheter when passing through the third lumen.

7. The apparatus of claim 1, wherein the catheter controller is configured to control movement of the catheter through the housing in a first direction that moves the catheter toward a patient and in a second direction that moves the catheter away from the patient.

8. The apparatus of claim 1, wherein the catheter is configured to pass a second fluid through the catheter.

9. An apparatus comprising:
a housing comprising:
a first lumen in the housing configured to receive a catheter;
a second lumen in the housing configured to receive a fluid;
a third lumen in the housing configured to allow both the catheter and the fluid to pass through the third lumen simultaneously;

a catheter controller associated with the housing, wherein the catheter controller is configured to control movement of the catheter through the housing in a first direction that moves the catheter toward a patient and in a second direction that moves the catheter away from the patient; and a manifold associated with the housing, wherein the manifold is configured to merge the first lumen, the second lumen, and the third lumen.

10. The apparatus of claim 9, wherein the catheter enters the housing through a first opening in the housing and exits the housing through a second opening in the housing.

11. The apparatus of claim 9, wherein the fluid is outside an outer surface of the catheter when passing through the third lumen.

12. The apparatus of claim 11, wherein the catheter is configured to pass a second fluid through the catheter.

13. The apparatus of claim 9, wherein the housing is configured to support single-handed control of the catheter by a human operator.

14. The apparatus of claim 9, wherein the catheter controller includes at least one of a wheel or a slider capable of control by a human operator.

15. The apparatus of claim 9, wherein the catheter controller is configured to control movement of the catheter through a human body.

* * * * *